United States Patent [19]
Ekern et al.

[11] Patent Number: 5,656,038
[45] Date of Patent: Aug. 12, 1997

[54] METHOD OF MAKING A ZINC ANODE FOR A REDUCED ENVIRONMENTAL HAZARD LECLANCHE CELL HAVING IMPROVED PERFORMANCE

[75] Inventors: Ronald J. Ekern; Terry G. Messing, both of Verona, Wis.

[73] Assignee: Rayovac Corporation, Madison, Wis.

[21] Appl. No.: 475,209

[22] Filed: Jun. 7, 1995

Related U.S. Application Data

[62] Division of Ser. No. 275,019, Jul. 13, 1994.

[51] Int. Cl.$^6$ ........................................... H01M 6/08
[52] U.S. Cl. .................................. 29/623.1; 429/166
[58] Field of Search ..................... 29/623.1; 429/229, 429/230, 166, 169

[56] References Cited

U.S. PATENT DOCUMENTS

| | | | |
|---|---|---|---|
| 3,650,825 | 3/1972 | Lihl | 117/217 |
| 3,877,993 | 4/1975 | Davis | 136/107 |
| 3,928,074 | 12/1975 | Jung et al. | 136/100 |
| 3,963,520 | 6/1976 | Bauer et al. | 136/107 |
| 3,970,476 | 7/1976 | Certon | 136/103 |
| 4,952,368 | 8/1990 | Skenazi et al. | 420/513 |
| 5,108,494 | 4/1992 | Uemura et al. | 75/347 |
| 5,425,913 | 6/1995 | Strauven et al. | 420/514 |

OTHER PUBLICATIONS

Mathewson, "Zinc—the Science & Technology of the Metal, Its Alloys & Compounds" pp. 523–533, 555–560, New York, 1959 (No Month).

Aufenast & Muller, "Gas Formation in Dry Cells," 335–355, U.K., 1963 (No Month).

Shuier, "Bimetallic Cowossan," 194–197, U.K., 1963 (No Month).

Miyazaki et al., "New Alloy Composition for Zinc Can," 110–112, 1987 (No Month) Progress in Baltenes, 198.

Linden, "The Zinc–Carbon Cell", pp. 5–1 to 5–42, 1984, New York. (no month).

Davis, "Metals Handbook", 9th Ed., vol. 14, 299–326, 343–360, Apr. 1988.

Cody et al., "Applied Statistics," 3rd Ed., 100–103, 1991 (No Month).

Unknown, "Mercury Free Dry Battery", Nikkei New Materials, 1–10, Mar. 1992.

Meesu, "The PMA Alloy", JEC Battery Newsletter, No. 5, Oct. 1993, pp. 30–42.

*Primary Examiner*—John S. Maples
*Attorney, Agent, or Firm*—Foley & Lardner; Thomas F. Woods

[57] ABSTRACT

A low iron zinc anode for a LeClanche cell, and methods of making and using same, are provided for in the invention. The zinc anode contains at least 95% zinc and no more than about 12 ppm iron, and may be configured for use in round or flat LeClanche cells. The zinc anodes of the invention may be used in general purpose and heavy duty batteries containing an electrolyte comprising zinc chloride as a primary component. Cells made in accordance with the invention exhibit improved capacity and other performance characteristics in respect of conventional cells.

20 Claims, 25 Drawing Sheets

METHOD OF MAKING A ZINC ANODE FOR A REDUCED ENVIRONMENTAL HAZARD LECLANCHE CELL HAVING IMPROVED PERFORMANCE

This application is a division of application Ser. No. 08/275,019, filed 13 Jul. 1994, and yet pending.

This invention was made with Government support. The Government has certain rights in this invention.

FIELD OF THE INVENTION

This invention relates to acid-type LeClanche primary cells having manganese dioxide cathodes, chloride-based electrolytes, and zinc anodes. The anode usually forms a container that holds the contents of the cell and serves as a negative current collector. A carbon rod usually serves as a positive current collector. The chloride-based electrolyte of the cell of the present invention may contain ammonium chloride. The present invention relates to cells commonly referred to as LeClanche, zinc-carbon, or zinc-chloride cells. Such terms are used interchangeably herein, all referring to the same type of cell or battery having an anode formed from a zinc alloy, manganese dioxide as a cathode, and a chloride-based electrolyte. LeClanche cells are sometimes further classified as heavy duty or general purpose cells. General purpose cells and heavy duty cells differ primarily in the type of manganese dioxide used as the cathode material. General purpose cells contain a lower grade of manganese dioxide, and may use a greater amount of ammonium chloride in the electrolyte. Heavy duty cells contain manganese dioxide of increased purity, and typically use a higher proportion of zinc chloride in the electrolyte.

BACKGROUND OF THE INVENTION

LeClanche cells have been commercially important for over a century, and in existence for more than 120 years. Within the last twenty years the commercial importance of LeClanche cells has diminished as a result of competition from alkaline cells, which provide longer life and generally superior performance. Alkaline cells cost two to four times more than LeClanche cells, however. Despite the commercial success and performance advantages of alkaline cells, however, LeClanche cells currently command an 18% share of the U.S. consumer round cell market. In Japan and most Third World countries LeClanche cells command a larger share of the consumer round cell market. Thus, LeClanche cells continue to command a commercially important segment of the worldwide consumer battery market, and are likely to do so for the foreseeable future.

Most improvements in the capacity and shelf life of LeClanche cells occurred between 1945 and 1965 before alkaline primary cells became commercially important. During those years new materials such as beneficiated manganese dioxide and zinc chloride electrolyte, and new designs such as paper lined cells, were introduced. Since 1965, however, few significant improvements in the performance of LeClanche cells have been made. Instead, over the past thirty years most changes in the design, construction and materials of LeClanche cells have been related to attempts to reduce mercury concentrations, corrosion of the zinc can anode, and hydrogen gas evolution.

To understand how LeClanche cell technology has evolved, it is helpful to review the basic function, components, and structure of such cells. LeClanche cells have a chloride-based electrolyte usually comprising a mixture of zinc chloride, water, ammonium chloride, sometimes zinc oxide, and optionally other pH-controlling materials or organic corrosion inhibitors. The cathode of a LeClanche cell typically comprises a mixture of manganese dioxide powder or granules, carbon or graphite particles, and the foregoing electrolyte mixture which at least partially wets the cathode mixture. In a LeClanche cell, a carbon rod, or pencil, is typically centrally disposed in a metal container comprising zinc, wherein the container (or can) functions as an anode, a negative current collector, and as a container in which various other elements of the cell are disposed. The carbon rod functions as a positive current collector, and is surrounded by the at least partially wetted cathode mix, which, in turn, engages the inner surface of the separator along the cathode's outer periphery. The separator is disposed between the outer periphery of the wetted cathode mix and the inner surface of the zinc container, or anode. The electrolyte permeates the cathode mix and the separator, and permits ionic transfer to occur between the anodic zinc can and the $MnO_2$ particles contained in the cathode.

Because the pH of a LeClanche cell is acidic, the chloride-based electrolyte strongly promotes the parasitic corrosion of zinc at the boundary between the inner surface of the can and the electrolyte. In fact, the zinc anode in a LeClanche cell is typically consumed by such reactions to such an extent that by the end of the cell's useful storage life, corrosion is visually apparent and the walls of the can are noticeably thinner. Such parasitic corrosive reactions not only affect the structural integrity of the can but, more importantly, often reduce significantly the capacity (and therefore the performance) of a LeClanche cell when it has been in storage prior to use. The effect is more pronounced at high temperatures, where even more capacity is lost in storage due to such parasitic corrosion reactions.

The basic reactions governing corrosion of a zinc can in a LeClanche cell are as follows:

  (eq. 1)

  (eq. 2)

Equation 1 describes the cathodic reduction of water at the inner surface of the zinc can. Equation 2 describes the oxidation of metallic zinc to valence state +2, wherein two electrons are released.

The two reactions are related in that the onset of one reaction induces the occurrence of the other, and thus induces the continuation or perpetuation of both reactions. The two interrelated reactions are not desired because they corrode the zinc can, and because they increase the amount of hydrogen gas present inside the sealed cell.

Equation 1 shows that the zinc metal of the can and water in the electrolyte of a LeClanche cell typically react to form hydrogen gas, which accumulates inside the cell. Some provision must be made for permitting the egress of such evolved gas to avoid cell rupture. Rupture of a LeClanche cell typically involves not only the release of hydrogen gas, but also the release of cathode mix containing acidic, corrosive electrolyte which can harm the device containing the cell. Carbon rods used in most LeClanche cells are often slightly porous and permeable, and therefore permit the egress of a nominal amount of evolved hydrogen gas from the cell interior. Because such carbon rods are often impregnated with wax and therefore cannot permit the egress of substantial amounts of evolved hydrogen gas, however, some allowance must typically be made in the design of LeClanche cell seals and containers for increased cell internal pressure owing to the accumulation of hydrogen gas therewithin. But excessive hydrogen gas production can lead to seal failure through overpressurization beyond the gas venting limits of the seal. Venting degrades the seal and allows water vapor to escape from the cell, resulting in cell dehydration and failure. Venting also typically permits oxygen to enter the cell, where it accelerates the aforementioned corrosion reaction at the inner surface of the zinc can by reacting directly with the zinc.

Equation 2 describes the basic corrosion reaction that typically occurs in LeClanche cells, wherein the zinc can progressively dissolves or corrodes, causing the walls of the zinc can to thin. Additionally, premature structural failure of the battery may occur through localized corrosion or "pinholing." Excessive corrosion can also cause premature performance failure of the battery through loss of ionic transport contact between the zinc can and the separator.

Corrosion of the zinc can in a LeClanche cell actually results from three different reactions:

corrosion of the zinc can occurring during the generation of electricity by the battery;

parasitic corrosion of the zinc can occurring during discharge of the battery, and parasitic corrosion of the zinc can occurring when the battery is in storage and is not being discharged.

The first of the foregoing corrosion reactions fulfills the intended function of the battery, e.g. the generation of electricity, and thus should not be hindered. The second and third of the foregoing corrosion reactions, however, actually reduce the capacity of the battery, and thus should be prevented to the greatest degree possible.

Various solutions to the gassing and corrosion problems attending LeClanche cells have been sought for decades. The most popular and widely employed solutions to both problems in LeClanche cells have been to:

add inorganic corrosion inhibitors to the cathode mix;

add organic corrosion inhibitors to the cathode mix, and make zinc cans from alloys containing a mixture of zinc, lead, cadmium, manganese, or other metals that inhibit parasitic corrosion reactions.

Several prior art disclosures have been made suggesting the foregoing attempts to solve the corrosion and gassing problems characteristic of LeClanche cells, including:

| Country | Pat. No. | Inventor/Applicant/ Publisher | Issue Date |
|---------|----------|-------------------------------|------------|
| U.K. | — | Aufenast et al. | 1963 |
| U.K. | — | Shreir | 1963 |
| U.S.A. | 3,650,825 | Lihl | 1972 |
| U.S.A. | 3,877,993 | Davis | 1975 |
| U.S.A. | 3,928,074 | Jung et al. | 1975 |
| U.S.A. | 3,970,476 | Cerfon | 1976 |
| U.S.A. | — | Linden | 1984 |
| Japan | — | Miyazaki et al. | 1987 |
| Japan | — | Nikkei New Materials | 1992 |
| Belgium | — | Meeus | 1993 |

In the proceedings of the 3rd International Symposium for Research and Development in Non-Mechanical Electrical Power Sources held at Bournemouth, the United Kingdom in October, 1963, subsequently published in 1963 by the MacMillan Company of New York in Volume 1 of the compilation "Batteries," in the article "Gas formation in dry cells," Aufenast and Muller discuss gas evolution and zinc corrosion in LeClanche cells at pp. 335–355. They disclose that undesired hydrogen gas production resulting from corrosion of the zinc can of LeClanche cells depends on the quality of the zinc can, on the composition of the electrolyte, and on small quantities of impurities. Aufenast and Muller disclose experiments wherein zinc strips having varying concentrations of different metal impurities were submerged in an electrolyte containing water, ammonium chloride, and zinc chloride. The hydrogen gas developed by each bimetallic couple was then measured over a fixed length of time. Their discussion on page 340 points out that ferrous iron and zinc produce "moderately active" hydrogen gas evolution, and that ferric iron shows no hydrogen gas activity at all.

In the foregoing compilation "Batteries," Shreir shows at pp. 195 that when a bimetallic couple of zinc and iron is placed in a solution of water and 1% NaCl, significant weight loss, or corrosion, of the zinc occurs, whereas the iron remains essentially uncorroded.

In U.S. Pat. No. 3,650,825 Lihl discloses a method of manufacturing an improved electrical contact by treating a known contact material such as silver or copper with mercury to enhance the electrical conductivity and contact making properties of the contact.

For many years mercury has remained the most popular and widely used of the inorganic corrosion inhibitors despite its relatively high cost. Mercury is, however, highly toxic. Almost all LeClanche cells are typically disposed of by being thrown away along with ordinary household garbage and trash, whereupon they enter the ordinary waste stream. While individual LeClanche cells usually contain only a small amount of mercury, the cumulative effect of large numbers of mercury-containing LeClanche cells entering the waste stream could cause significant quantities of mercury to be released to the environment.

Because mercury is toxic, numerous other inorganic and organic corrosion inhibitors, including various petroleum-based products, mineral oils, animal oils, chromates, and chromic acids, have been tested or used in LeClanche cells. Most such inhibitors, however, do not permit the total elimination of mercury from LeClanche cells. Instead, they typically permit only a reduced amount of mercury to be used, and do not permit the total elimination of mercury from LeClanche cells.

In U.S. Pat. No. 3,877,993 Davis discloses a LeClanche cell having an organic corrosion inhibitor comprising polymerized or copolymerized dimethyl dially quaternary ammonium salt. Davis' corrosion inhibitor disperses through the cathode mixture via the electrolyte to the inner surface of the zinc can to be deposited on the inner surface of the zinc can anode where it inhibits, to some degree, the aforementioned corrosion and gassing reactions. Davis' corrosion inhibitor enables the amount of mercury required in a LeClanche cell to be lowered.

In U.S. Pat. No. 3,928,074 Jung et al. disclose a LeClanche cell having a polyethylene glycol monoalkyl ether (PEL) corrosion inhibitor added to the ammonium chloride/water electrolyte thereof. The organic PEL additive reduces gassing rates in LeClanche cells having no mercury to levels commensurate with similarly constructed LeClanche cells containing mercury.

In U.S. Pat. No. 3,970,476 Cerfon discloses a LeClanche cell having a mixture of electrolyte and an organic ascorbic acid corrosion inhibitor. Cerfon discloses superior high temperature storage characteristics resulting from the addition of ascorbic acid to the ammonium chloride/water electrolyte of a LeClanche cell.

Another means of attempting to solve the gassing and corrosion problems attending LeClanche cells has been to form the zinc cans thereof from alloys containing a mixture of zinc, lead, and cadmium, wherein the inner wall of the can is coated with an amalgam of mercury. Cadmium is typically included in such zinc can alloys because it aids the zinc can manufacturing process. Typically, about 0.01% by weight mercury is added to the electrolyte of the LeClanche cell at the time of cell manufacture in the form of mercurous chloride. After the cell is assembled and closed, the mercury disperses towards the inner walls of the zinc can to form a protective mercury-zinc amalgam thereon. The mercury-zinc amalgam reduces undesired parasitic corrosion and gas evolution reactions in LeClanche cells.

In the book entitled "Handbook of Batteries and Fuel Cells," published in 1984 by McGraw-Hill Publishing Company, Chapter 5 of which is hereby incorporated by reference, at pp. 5–7 Linden discloses LeClanche cells having zinc cans containing up to about 3000 ppm cadmium and more than 3000 ppm lead. Linden discloses further that lead contributes to the forming qualities of the can, that cadmium makes the zinc corrosion-resistant to ordinary dry cell electrolytes, adds strength to the can, and is usually present in amounts of up to 1000 ppm. At page 5–7 Linden states that:

> [M]etallic impurities such as copper, nickel, iron, and cobalt cause corrosive reactions with the zinc and must be avoided. In addition, iron makes zinc harder and less workable.

In the paper "New alloy composition for zinc can for carbon-zinc dry cells," published in 1987 by the JEC Press in vol. 6 of "Progress in Batteries & Solar Cells," which paper is hereby incorporated by reference, at pp. 110–112 Miyazaki et al. disclose LeClanche cells having no mercury therein, wherein the zinc can alloy contains a mixture of zinc, lead, cadmium, indium, and manganese, and wherein zero-mercury cells having zinc cans made of the disclosed alloy exhibit reasonably good performance characteristics and corrosion resistance in respect of LeClanche cells containing mercury.

In the paper "Mercury free dry battery materialized in Japan, mercury function substituted by a combination of materials," published in "Nikkei New Materials" in 1992, the reduction of hydrogen gassing rates through the removal of impurities from zinc can anodes in "manganese dry batteries" is disclosed at pp. 1–10.

In the paper entitled "The PMA Alloy," published in 1993 by the JEC Press in No. 5 of the "JEC Battery Newsletter," which paper is hereby incorporated by reference, Meeus discloses at pp. 30–43 zinc cans having lead concentrations as low as 2000 ppm, having no cadmium therein, and made by extruding zinc cans from calots. At page 33 Meeus discusses the beneficial effects of having lead concentrations in zinc cans exceeding 2000 ppm, wherein such lead concentrations reduce gassing and corrosion rates.

The foregoing means of reducing or eliminating mercury in LeClanche cells through the use of special alloys in the zinc can anode require, however, the presence of significant amounts of lead, cadmium, or both. It is well known that lead and cadmium are toxic metals. The special zinc can alloys developed to eliminate the use of mercury in LeClanche cells, and known of heretofore, do not contain reduced concentrations of either or both of those toxic metals. Some of the foregoing special alloys even contain elevated concentrations of both toxic metals.

What is needed is a LeClanche cell having reduced mercury, cadmium, or lead concentrations therein.

What is also needed is a LeClanche cell having improved performance, capacity, and storage characteristics.

What is further needed is a LeClanche cell having the two foregoing attributes, but having, in addition, a slightly increased cost, or the same cost, as prior art LeClanche cells.

It is therefore an object of the present invention to provide a LeClanche cell having superior performance, capacity, and storage characteristics.

It is another object of the present invention to provide a LeClanche cell having increased performance at low cost.

It is still another object of the present invention to provide a LeClanche cell that presents a reduced hazard to the environment, wherein the cell may be disposed of in a landfill without presenting any significant hazard to human or other forms of life.

It is a further object yet of the present invention to provide a LeClanche cell having reduced or no mercury therein.

It is a still further object yet of the present invention to provide a LeClanche cell having reduced or no cadmium therein.

It is another object of the present invention to provide a LeClanche cell having reduced or no lead therein.

It is another object yet of the present invention to provide a LeClanche cell having reduced gassing rates.

It is still another object of the present invention to provide a LeClanche cell having reduced parasitic corrosion reactions occurring on the surface of the zinc anode thereof.

It is still another object yet of the present invention to provide methods of making zinc anodes for LeClanche cells, wherein cells so made exhibit superior performance, capacity, and storage characteristics.

It is a further object of the present invention to provide methods of making zinc anodes for LeClanche cells that present a reduced hazard to the environment.

It is a further object yet of the present invention to provide methods of making corrosion-resistant zinc anodes for LeClanche cells.

It is still another object yet of the present invention to provide methods of making zinc anodes that reduce gassing in LeClanche cells.

It is a feature of the present invention to provide a zinc anode for a LeClanche cell.

It is another feature of the present invention to provide a iron zinc anode for a LeClanche cell, the anode consisting essentially of a zinc alloy containing at least 95% zinc and no more than about 12 ppm iron by weight.

It is another feature yet of the present invention to provide a zinc anode for a LeClanche cell, the anode containing low amounts of cadmium.

It is still another feature yet of the present invention to provide a zinc anode for a LeClanche cell, the anode containing no more than about 30 ppm cadmium by weight.

It is a further feature of the present invention to provide a zinc anode for LeClanche cell, the anode containing low amounts of lead.

It is a further feature yet of the present invention to provide a zinc anode for a LeClanche cell, the anode containing no more than about 800 ppm lead by weight.

It is a still further feature yet of the present invention to provide a zinc anode for a LeClanche cell, the anode containing, in addition to no more than about 12 ppm iron by weight, either alone or in combination, no more than about 30 ppm by weight cadmium, and no more than about 800 ppm by weight lead.

It is another feature of the present invention to provide a zinc anode in a LeClanche cell, the anode having no amalgam or mercury disposed on the surface thereof.

It is a further feature of the present invention to provide a LeClanche cell having reduced mercury therein.

It is yet another feature of the present invention to provide a LeClanche cell having no mercury therein.

It is a still further feature yet of the present invention to provide a LeClanche cell, the cathode, the electrolyte, and the anode thereof containing, in combination, no more than about 0.01 percent by weight mercury.

It is a further feature of the present invention to provide a LeClanche cell, the cathode, the electrolyte, and the zinc anode thereof containing, in combination, no, or substantially no, mercury.

It is a further feature yet of the present invention to provide a zinc alloy for forming a zinc anode of a LeClanche cell, the zinc alloy containing no more than about 12 ppm iron by weight.

It is a still a further feature yet of the present invention to provide a method of making a zinc alloy for forming a zinc anode of a LeClanche cell, the method including the steps of selecting zinc as a starting material, and thereafter minimizing contact between the zinc starting material and susceptible iron.

It is an advantage of the present invention that the zinc anode thereof costs about the same to manufacture as a conventional zinc anode for a LeClanche cell.

SUMMARY OF THE INVENTION

This invention satisfies the above needs. A novel LeClanche electrochemical cell, zinc anode therefor, zinc alloy from which the zinc anode is made, and methods of making and using same, are provided for.

Some objects of the present invention are attained in a zinc anode configured for use in a LeClanche cell, the anode consisting essentially of a zinc alloy containing at least 95% zinc and no more than about 12 ppm iron by weight.

Other objects of the present invention are attained in a zinc anode configured for use in a LeClanche cell, the anode consisting essentially of a zinc alloy containing no more than 12 ppm iron by weight and at least 96% zinc, at least 97% zinc, at least 98% zinc, at least 99% zinc, or at least 99.5% zinc.

Other objects yet of the present invention are attained in a zinc anode configured for use in a LeClanche cell, the anode consisting essentially of a zinc alloy containing at least 95% zinc and no more than about 11 ppm iron by weight, no more than about 10 ppm iron by weight, no more than about 8 ppm iron by weight, no more than about 6 ppm iron by weight, no more than about 4 ppm iron by weight, more than 1 ppm iron by weight, more than about 2 ppm iron by weight, between about 2 ppm iron by weight and about 10 ppm iron by weight, no more than about 6000 ppm by weight lead, no more than about 800 ppm by weight lead, no more than about 200 ppm cadmium by weight, or no more than about 30 ppm by weight cadmium.

Still other objects yet of the present invention are attained in a zinc anode, the anode consisting essentially of a zinc alloy containing at least 95% zinc and no more than about 12 ppm iron by weight, wherein the anode is configured for use in a round LeClanche cell and forms a cylindrical can having a bottom and a sidewall extending upwardly therefrom, the can having an initially open top end, the anode is configured for use in a round LeClanche cell selected from the group consisting of AAA, AA, C and D sizes, the anode forms an inner zinc can disposed within an outer can, the inner can being in electrical contact therewith, the anode is configured for use in a round LeClanche cell and forms a cylindrical sleeve having open top and bottom ends, the sleeve being disposed within an outer can and in electrical contact therewith, the anode forms a plating disposed on an electrically conductive surface, or the anode is configured for use in a flat LeClanche cell and forms a rectangular member having substantially flat opposing major top and bottom surfaces.

Further objects of the present invention are attained in a zinc anode configured for use in a LeClanche cell, the anode consisting essentially of a zinc alloy containing up to about 12 ppm iron by weight, up to 2000 ppm cadmium by weight, up to 6000 ppm lead by weight, up to 100 ppm magnesium by weight, up to 600 ppm manganese by weight, up to 200 ppm copper by weight, up to 10 ppm nickel by weight, up to 5 ppm cobalt by weight, up to 1000 ppm thallium by weight, up to 5 ppm by weight of each of molybdenum, antimony, arsenic, up to 8000 ppm by weight of each of aluminum, indium, bismuth, and calcium, the balance being zinc.

Still further objects of the present invention are attained in a zinc anode configured for use in a LeClanche cell, the anode consisting essentially of a zinc alloy containing up to 2000 ppm cadmium by weight, up to 6000 ppm lead by weight, up to 100 ppm magnesium by weight, up to 600 ppm manganese by weight, up to 200 ppm copper by weight, up to 10 ppm nickel by weight, up to 5 ppm cobalt by weight, up to 1000 ppm thallium by weight, up to 5 ppm by weight of each of molybdenum, antimony, arsenic, up to 8000 ppm by weight of each of aluminum, indium, bismuth, and calcium, the alloy containing no more than about 11 ppm iron by weight, no more than about 10 ppm iron by weight, no more than about 8 ppm iron by weight, no more than about 6 ppm iron by weight, no more than about 4 ppm iron by weight, more than 1 ppm iron by weight, more than about 2 ppm iron by weight, or between about 2 ppm iron by weight and about 10 ppm iron by weight, wherein the balance of the alloy is zinc.

Still further objects yet of the present invention are attained in a zinc anode configured for use in a LeClanche cell, the anode consisting essentially of a zinc alloy containing up to about 12 ppm iron by weight, up to 2000 ppm cadmium by weight, up to 6000 ppm lead by weight, up to 100 ppm magnesium by weight, up to 600 ppm manganese by weight, up to 200 ppm copper by weight, up to 10 ppm nickel by weight, up to 5 ppm cobalt by weight, up to 1000 ppm thallium by weight, up to 5 ppm by weight of each of molybdenum, antimony, arsenic, up to 8000 ppm by weight of each of aluminum, indium, bismuth, and calcium, the balance being zinc, wherein the anode forms a cylindrical can having a bottom and a sidewall extending upwardly therefrom, the can having an initially open top end, the anode is a cylindrical can selected from the group consisting of AAA, AA, C and D sizes, or the anode is configured for use in a flat LeClanche cell and forms a rectangular member having substantially flat opposing major top and bottom surfaces.

Additional objects of the present invention are attained in a LeClanche electrochemical cell comprising a zinc anode, the anode consisting essentially of a zinc alloy containing at least 95% zinc and no more than about 12 ppm iron by weight, a manganese dioxide cathode, an ionically permeable separator interposed between the anode and the cathode, an electrolyte comprising zinc chloride as a primary component, the electrolyte at least partially wetting the anode, the cathode, and the separator, and a current collector electrically connected to the cathode.

Additional objects yet of the present invention are attained in a LeClanche electrochemical cell comprising a zinc anode, the anode consisting essentially of a zinc alloy containing no more than about 12 ppm iron by weight, a manganese dioxide cathode, an ionically permeable separator interposed between the anode and the cathode, an electrolyte comprising zinc chloride as a primary component, the electrolyte at least partially wetting the anode, the cathode, and the separator, and a current collector electrically connected to the cathode, wherein the alloy contains at least 96% zinc, at least 97% zinc, at least 98% zinc, at least 99% zinc, or at least 99.5 % zinc.

Still additional objects yet of the present invention are attained in a LeClanche electrochemical cell comprising a zinc anode, the anode consisting essentially of a zinc alloy containing at least 95% zinc, a manganese dioxide cathode, an ionically permeable separator interposed between the anode and the cathode, an electrolyte comprising zinc chloride as a primary component, the electrolyte at least partially wetting the anode, the cathode, and the separator, and a current collector electrically connected to the cathode, wherein the alloy contains no more than about 11 ppm iron by weight, no more than about 10 ppm iron by weight, no more than about 8 ppm iron by weight, no more than about 6 ppm iron by weight, no more than about 4 ppm iron by weight, more than 1 ppm iron by weight, more than about 2 ppm iron by weight, or between about 2 ppm iron by weight and about 10 ppm iron by weight.

Yet additional objects of the present invention are attained in a LeClanche electrochemical cell comprising a zinc anode, the anode consisting essentially of a zinc alloy containing at least 95% zinc and no more than about 12 ppm iron by weight, a manganese dioxide cathode, an ionically permeable separator interposed between the anode and the cathode, an electrolyte comprising zinc chloride as a primary component, the electrolyte at least partially wetting the anode, the cathode, and the separator, and a current collector electrically connected to the cathode, wherein the anode forms a cylindrical can having a bottom and a sidewall extending upwardly therefrom, the can having an initially open top end, the anode is configured for use in a round LeClanche cell selected from the group consisting of AAA, AA, C and D sizes, the anode forms an inner zinc can disposed within an outer can, the inner can being in electrical contact therewith, the anode forms a cylindrical sleeve having open top and bottom ends, the sleeve being disposed within an outer can and in electrical contact therewith, the anode forms a plating disposed on an electrically conductive surface, or the anode is configured for use in a flat LeClanche cell and forms a rectangular member having substantially flat opposing major top and bottom surfaces.

Additional objects still yet of the present invention are attained in a LeClanche electrochemical cell comprising a zinc anode, the anode consisting essentially of a zinc alloy containing at least 95% zinc and no more than about 12 ppm iron by weight, a manganese dioxide cathode, an ionically permeable separator interposed between the anode and the cathode, an electrolyte comprising zinc chloride as a primary component, the electrolyte at least partially wetting the anode, the cathode, and the separator, and a current collector electrically connected to the cathode, wherein the cell contains no more than about 0.01% mercury by weight, or the cell contains substantially no mercury.

Other objects of the present invention are attained in a zinc alloy consisting essentially of up to about 12 ppm iron by weight, up to 2000 ppm cadmium by weight, up to 6000 ppm lead by weight, up to 100 ppm magnesium by weight, up to 600 ppm manganese by weight, up to 200 ppm copper by weight, up to 10 ppm nickel by weight, up to 5 ppm cobalt by weight, up to 1000 ppm thallium by weight, up to 5 ppm by weight of each of molybdenum, antimony, arsenic, up to 8000 ppm by weight of each of aluminum, indium, bismuth, and calcium, the balance being zinc.

Other objects yet of the present invention are attained in a zinc alloy consisting essentially of up to about 12 ppm iron by weight, up to 2000 ppm cadmium by weight, up to 6000 ppm lead by weight, up to 100 ppm magnesium by weight, up to 600 ppm manganese by weight, up to 200 ppm copper by weight, up to 10 ppm nickel by weight, up to 5 ppm cobalt by weight, up to 1000 ppm thallium by weight, up to 5 ppm by weight of each of molybdenum, antimony, arsenic, up to 8000 ppm by weight of each of aluminum, indium, bismuth, and calcium, wherein the alloy contains at least 96% zinc, at least 97% zinc, at least 98% zinc, at least 99% zinc, or at least 99.5 % zinc.

Still other objects of the present invention are attained in a zinc alloy consisting essentially of up to 2000 ppm cadmium by weight, up to 6000 ppm lead by weight, up to 100 ppm magnesium by weight, up to 600 ppm manganese by weight, up to 200 ppm copper by weight, up to 10 ppm nickel by weight, up to 5 ppm cobalt by weight, up to 1000 ppm thallium by weight, up to 5 ppm by weight of each of molybdenum, antimony, arsenic, up to 8000 ppm by weight of each of aluminum, indium, bismuth, and calcium, wherein the alloy contains no more than about 11 ppm iron by weight, no more than about 10 ppm iron by weight, no more than about 8 ppm iron by weight, no more than about 6 ppm iron by weight, no more than about 6 ppm iron by weight, no more than about 4 ppm iron by weight, more than 1 ppm iron by weight, more than about 2 ppm iron by weight, between about 2 ppm iron by weight and about 10 ppm iron by weight, the balance being zinc.

Still other objects yet of the present invention are attained in a zinc alloy consisting essentially of no more than about 12 ppm iron by weight, up to 50 ppm cadmium by weight, up to 1000 ppm lead by weight, up to 30 ppm magnesium by weight, up to 300 ppm manganese by weight, up to 50 ppm copper by weight, up to 5 ppm nickel by weight, up to 2 ppm cobalt by weight, up to 50 ppm thallium by weight, up to 2 ppm by weight of each of molybdenum, antimony, arsenic, up to 1000 ppm by weight of each of aluminum, indium, bismuth, and calcium, the balance being zinc.

Still more objects yet of the present invention are attained in a zinc alloy consisting essentially of no more than about 12 ppm iron by weight, up to 30 ppm cadmium by weight, up to 800 ppm lead by weight, up to 15 ppm magnesium by weight, up to 150 ppm manganese by weight, up to 5 ppm copper by weight, up to 1 ppm nickel by weight, up to 1 ppm cobalt by weight, up to 30 ppm thallium by weight, up to 1 ppm by weight of each of molybdenum, antimony, arsenic, up to 500 ppm by weight of each of aluminum, indium, bismuth, and calcium, the balance being zinc.

Further objects of the present invention are attained in a method of making a zinc anode configured for use in a LeClanche cell, the method comprising the steps of selecting as a starting material zinc containing no more than about 12 ppm iron by weight, melting the starting material to form molten zinc, minimizing contact between the molten zinc and susceptible iron, adding up to 2000 ppm cadmium by weight, up to 6000 ppm lead by weight, up to 100 ppm magnesium by weight, up to 600 ppm manganese by weight, up to 200 ppm copper by weight, up to 10 ppm nickel by weight, up to 1000 ppm thallium by weight, and up to 8000 ppm by weight of each of aluminum, indium, bismuth, and calcium, to the molten zinc to form a molten zinc alloy, minimizing contact between the molten zinc alloy and susceptible iron, cooling the molten zinc alloy to form a zinc alloy, and forming the zinc alloy into an anode configured for use in a LeClanche cell, wherein the anode so produced consists essentially of a zinc alloy containing at least 95% zinc and no more than about 12 ppm iron by weight.

Further objects yet of the present invention are attained in a method of making a zinc anode configured for use in a LeClanche cell, the method comprising the steps of selecting as a starting material zinc containing no more than about 12 ppm iron by weight, melting the starting material to form molten zinc, minimizing contact between the molten zinc and susceptible iron, adding up to 2000 ppm cadmium by weight, up to 6000 ppm lead by weight, up to 100 ppm magnesium by weight, up to 600 ppm manganese by weight, up to 200 ppm copper by weight, up to 10 ppm nickel by weight, up to 1000 ppm thallium by weight, and up to 8000 ppm by weight of each of aluminum, indium, bismuth, and calcium, to the molten zinc to form a molten zinc alloy, minimizing contact between the molten zinc alloy and susceptible iron, cooling the molten zinc alloy to form a zinc alloy, forming the zinc alloy into an anode configured for use in a LeClanche cell, and controlling the iron content in the molten zinc, the molten zinc alloy, the zinc alloy, and the anode such that the anode contains no more than 11 ppm iron by weight, no more than 10 ppm iron by weight, no more than 8 ppm iron by weight, no more than 6 ppm iron by weight, no more than 4 ppm iron by weight, more than 1 ppm iron by weight, more than about 2 ppm iron by weight, or between about 2 ppm iron by weight and 10 ppm iron by weight, wherein the anode so produced contains at least 95% zinc.

Still further objects yet of the present invention are attained in a method of making a zinc anode configured for use in a LeClanche cell, the method comprising the, steps of selecting as a starting material zinc containing no more than about 12 ppm iron by weight, melting the starting material to form molten zinc, minimizing contact between the molten zinc and susceptible iron, adding up to 2000 ppm cadmium by weight, up to 6000 ppm lead by weight, up to 100 ppm magnesium by weight, up to 600 ppm manganese by weight, up to 200 ppm copper by weight, up to 10 ppm nickel by weight, up to 1000 ppm thallium by weight, and up to 8000 ppm by weight of each of aluminum, indium, bismuth, and calcium, to the molten zinc to form a molten zinc alloy, minimizing contact between the molten zinc alloy and susceptible iron, cooling the molten zinc alloy to form a zinc alloy, and forming the zinc alloy into an anode configured for use in a LeClanche cell by one of the steps of deep drawing and impact extruding, wherein the anode so produced consists essentially of a zinc alloy containing at least 95% zinc and no more than about 12 ppm iron by weight.

Other objects of the present invention are attained in a method of making a zinc anode configured for use in a LeClanche cell, the method comprising the steps of selecting as a starting material zinc containing no more than about 12 ppm iron by weight, melting the starting material to form molten zinc, minimizing contact between the molten zinc and susceptible iron, adding up to 2000 ppm cadmium by weight, up to 6000 ppm lead by weight, up to 100 ppm magnesium by weight, up to 600 ppm manganese by weight, up to 200 ppm copper by weight, up to 10 ppm nickel by weight, up to 1000 ppm thallium by weight, and up to 8000 ppm by weight of each of aluminum, indium, bismuth, and calcium, to the molten zinc to form a molten zinc alloy, minimizing contact between the molten zinc alloy and susceptible iron, cooling the molten zinc alloy to form a zinc alloy, and forming the zinc alloy into an anode configured for use in a LeClanche cell such that the anode forms a cylindrical can having a bottom and a sidewall extending upwardly therefrom, the can having an initially open top end, a round LeClanche cell selected from the group consisting of AAA, AA, C and D sizes, or a rectangular member having substantially flat opposing major top and bottom surfaces, wherein the anode consists essentially of a zinc alloy containing at least 95% zinc and no more than about 12 ppm iron by weight.

Additional objects of the present invention are attained in a method of making an electrochemical LeClanche cell comprising the steps of selecting a cathode material comprising manganese dioxide, selecting an electrolyte comprising chloride as a primary component, selecting a zinc anode configured for use in the cell, the anode consisting essentially of a zinc alloy containing at least 95% zinc and no more than about 12 ppm iron by weight, selecting a cathode current collector comprising carbonaceous material, selecting an ionically permeable separator having first and second major opposing surfaces, placing the first surface of the separator propinquant to the anode, placing the cathode material propinquant to the second surface of separator, placing the cathode current collector propinquant to the cathode material, wetting at least one of the anode, the separator and the cathode material with the electrolyte, and sealing the cell to at least inhibit the ingress of air therein.

Additional objects yet of the present invention are attained in a method of making an electrochemical LeClanche cell comprising the steps of selecting a cathode material comprising manganese dioxide, selecting an electrolyte comprising chloride as a primary component, selecting a zinc anode configured for use in the cell, the anode consisting essentially of a zinc alloy containing no more than about 12 ppm iron by weight and at least 95% zinc, at least 96% zinc, at least 97% zinc, at least 98% zinc, at least 99% zinc, or at least 99.5 % zinc, selecting a cathode current collector comprising carbonaceous material, selecting an ionically permeable separator having first and second major opposing surfaces, placing the first surface of the separator propinquant to the anode, placing the cathode material propinquant to the second surface of separator, placing the cathode current collector propinquant to the cathode material, wetting at least one of the anode, the separator and the cathode material with the electrolyte, and sealing the cell to at least inhibit the ingress of air therein.

Still additional objects of the present invention are attained in a method of making an electrochemical LeClanche cell comprising the steps of selecting a cathode material comprising manganese dioxide, selecting an electrolyte comprising chloride as a primary component, selecting a zinc anode configured for use in the cell, the anode consisting essentially of a zinc alloy containing at least 95% zinc and no more than about 11 ppm iron by weight, no more than about 10 ppm iron by weight, no more than about 8 ppm iron by weight, no more than about 6 ppm iron by weight, no more than about 4 ppm iron by weight, more than 1 ppm iron by weight, more than about 2 ppm iron by weight, or between about 2 ppm iron by weight and about 10 ppm iron by weight, selecting a cathode current collector comprising carbonaceous material, selecting an ionically permeable separator having first and second major opposing surfaces, placing the first surface of the separator propinquant to the anode, placing the cathode material propinquant to the second surface of separator, placing the cathode current collector propinquant to the cathode material, wetting at least one of the anode, the separator and the cathode material with the electrolyte, and sealing the cell to at least inhibit the ingress of air therein.

Still additional objects yet of the present invention are attained in a method of using a LeClanche electrochemical cell comprising a zinc anode, a positive terminal, and a negative terminal, the zinc anode being configured for use in the LeClanche cell, the anode consisting essentially of a zinc alloy containing at least 95% zinc and no more than about 12 ppm iron by weight, the method comprising the step of discharging the cell across its positive and negative terminals.

BRIEF DESCRIPTION OF THE DRAWINGS

The foregoing and other objects, features, and advantages of the present invention will become better understood by referring to the following description, appended claims, and accompanying drawings, where:

DETAILED DESCRIPTION OF THE PREFERRED EMBODIMENTS

While those skilled in the art will recognize that the present invention is applicable to all types of LeClanche cells, batteries, and anodes, and methods of making and using same, the particular embodiments of the invention set forth herein relate to round cell and 9-Volt LeClanche cells and batteries.

Figure 1:
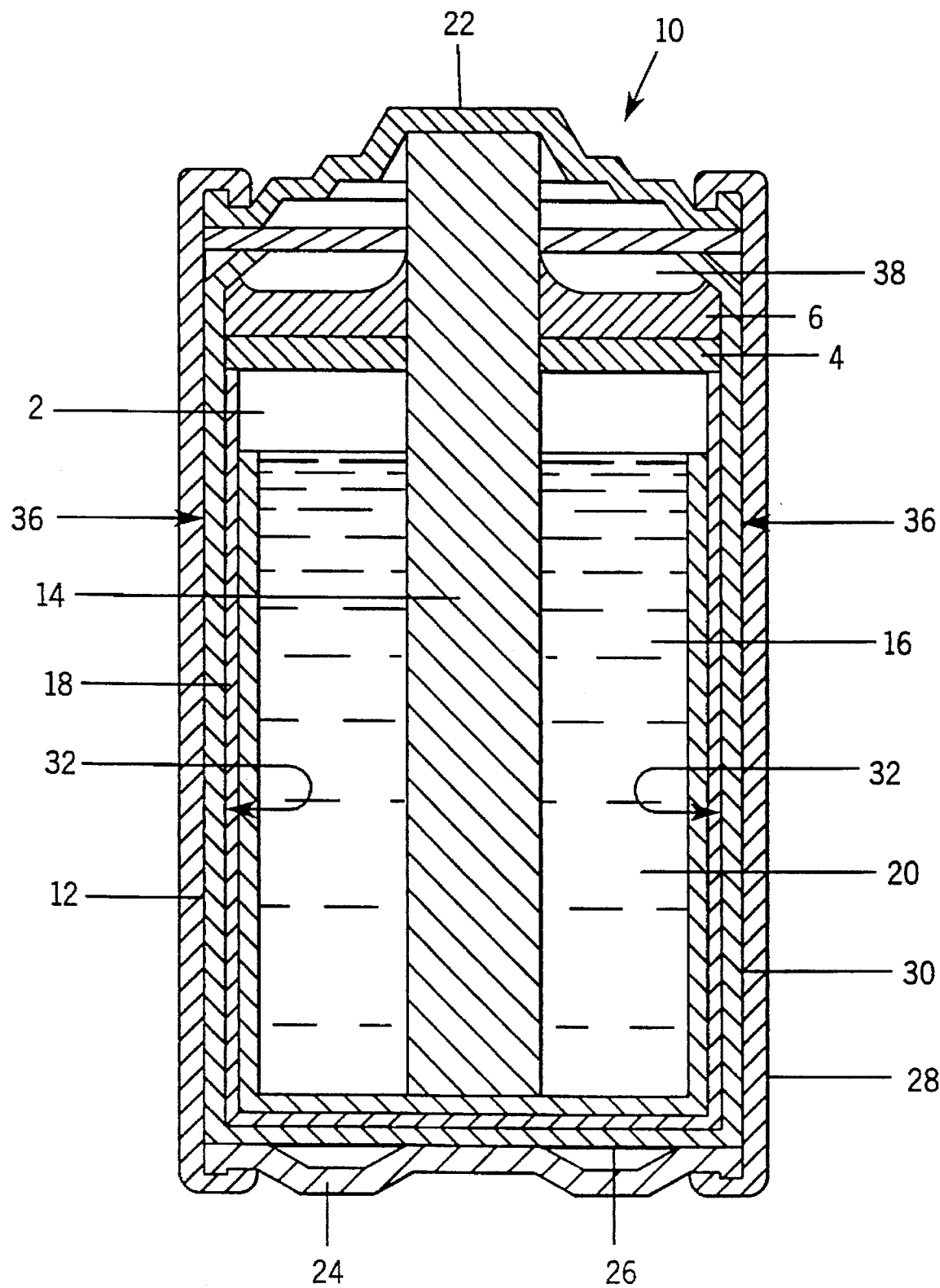
FIG. 1 is a cross-sectional view of a first embodiment of a round LeClanche cell of the present invention, wherein the zinc can contains no more than about 12 ppm iron by weight.

FIG. 1 is a cross-sectional view of a first embodiment of a round LeClanche cell of the present invention, wherein zinc anode 12 contains no more than about 12 ppm iron by weight. In round cell 10 of FIG. 1, zinc anode 12 (referred to herein interchangeably as zinc can 12, or zinc container 12) serves as the zinc anode of the LeClanche cell, the can forming a container having bottom 26, upstanding inner sidewall 32, and upstanding outer sidewall 36 extending upwardly therefrom.

Several components of the round LeClanche cell are disposed within zinc anode 12 having an initially open top end 38. Carbon rod 14 in the center of the cell functions as the cathode current collector. Cathode material 16 is disposed around carbon rod 14. Separator 18 prevents inner sidewalls 32 of zinc can 12 from coming into direct electrical contact with cathode material 16. Liquid electrolyte 20 is disposed substantially evenly throughout cathode material 16.

Expansion void 2, disposed between cathode material 16 and seal washer 4, permits the expansion of various cell components and gases to occur therein as the cell discharges. Seal washer 4 typically comprises wax impregnated paper, and forms a barrier atop which asphalt sealant 6 is disposed.

Optionally, an inner seal of the type disclosed in U.S. patent application Ser. No. 08/236,578 entitled "Electrochemical Cell Having Inner Seal," filed on May 2, 1994, the disclosure of which is hereby incorporated by reference in its entirety, may be disposed between seal washer 4 and cathode material 16.

Top cover 22 is in electrical contact with carbon rod 14, and serves as the positive terminal of the cell. Bottom cover 24 is in electrical contact with bottom 26 of zinc can or container 12, and serves as the negative terminal of the cell. Outer jacket 28, made of steel, paper, plastic or the like, extends between top cover 22 and bottom cover 24, and engages outer upstanding sidewall 36 of zinc anode 12.

Figure 2:
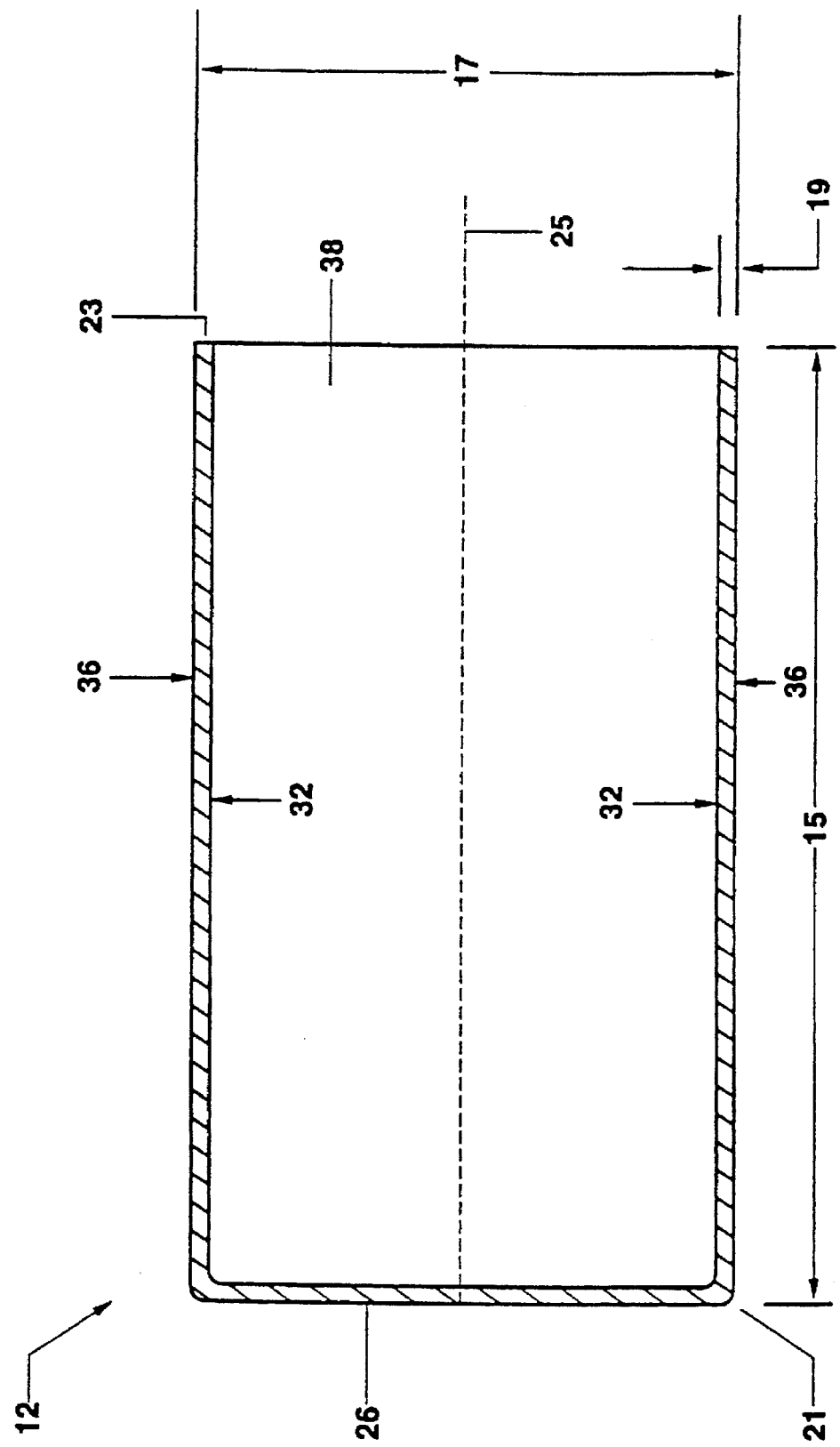
FIG. 2 is a cross-sectional view of the zinc can of the round LeClanche cell of FIG. 1 prior to cell assembly, and prior to inward crimping of the top edge thereof.

FIG. 2 is a cross-sectional view of the zinc anode of the round LeClanche cell of FIG. 1, wherein zinc anode 12 is shown as it appears prior to other cell components being placed therein, and prior to the top end thereof being crimped inwardly during the cell manufacturing and assembly process. Zinc anode 12 comprises bottom 26, inner sidewall 32, top edge 23, and outer sidewall 36, such components forming a can or container 12 having initially open top end 38. In its typical commercial round cell embodiments, zinc anode 12 is characterized by physical dimensions length 15, radius 21, outer diameter 17, and sidewall thickness 19, as shown in FIG. 2. Table 1 presents preferred specifications for those dimensions in round LeClanche cells of the present invention selected from the group consisting of AAA, AA, C, and D sizes.

TABLE 1

Preferred Dimensions of Zinc Anodes for Round LeClanche Cells of the Present Invention

| Dimension | Round Cell Size and Type | Corresponding Specification (inches) |
|---|---|---|
| Length 15 | AA (heavy duty) | 1.783 ± 0.002 |
| | AA (general purpose) | 1.783 ± 0.002 |
| | C (heavy duty) | 1.656 ± 0.016 |
| | C (general purpose) | 1.656 ± 0.016 |
| | D (heavy duty industrial) | 2.062 ± 0.016 |
| | D (heavy duty) | 2.062 ± 0.016 |
| | D (general purpose) | 2.062 ± 0.016 |
| | D lantern (heavy duty) | 3.406 ± 0.016 |
| Outer Diameter 17 | AA (heavy duty) | 0.515 ± 0.003 |
| | AA (general purpose) | 0.515 ± 0.003 |
| | C (heavy duty) | 0.892 ± 0.003 |
| | C (general purpose) | 0.892 ± 0.003 |
| | D (heavy duty industrial) | 1.183 ± 0.003 |
| | D (heavy duty) | 1.183 ± 0.003 |
| | D (general purpose) | 1.183 ± 0.003 |
| | D lantern (heavy duty) | 1.245 ± 0.003 |
| | D lantern (general purpose) | 1.183 ± 0.003 |
| Thickness 19 | AA (heavy duty) | 0.011 – 0.014 |
| | AA (general purpose) | 0.011 – 0.014 |
| | C (heavy duty) | 0.014 – 0.017 |
| | C (general purpose) | 0.013 – 0.015 |
| | D (heavy duty industrial) | 0.014 – 0.016 |
| | D (heavy duty) | 0.016 – 0.018 |
| | D (general purpose) | 0.013 – 0.015 |
| | D lantern (heavy duty) | 0.017 – 0.019 |
| | D lantern (general purpose) | 0.013 – 0.015 |
| Radius 21 | AA (geavy duty) | 0.047 |
| | AA (general purpose) | 0.047 |
| | C (heavy duty) | 0.063 |
| | C (general purpose) | 0.063 |
| | D (heavy duty industrial) | 0.063 |
| | D (heavy duty) | 0.063 |
| | D (general purpose) | 0.063 |
| | D lantern (heavy duty) | 0.063 |
| | D lantern (general purpose) | 0.063 |

To attain maximum performance and reliability in round LeClanche cells of the present invention, zinc anode 12 should conform to the following additional specifications prior to cell assembly. Referring to FIG. 2, top edge 23 should exhibit thereon substantially no irregularities such as burrs, rough edges, or slivers. Zinc anode 12 should not exhibit any blisters, cracks, laminations, wrinkles, or tears, and should not have any foreign material on the surface thereof such as drawing or cleaning compound residuum. Sidewalls 32 and 36, and bottom 26, should form a cylindrical can 12 having a cross-section that is substantially circular when viewed at an angle of 90 degrees in respect of a plane perpendicular to longitudinal axis 25.

Most preferably, the dimensions presented in Table 1 should be confirmed by measuring length 15, outside diameter 17, thickness 19, and radius 21 of a representative low zinc anode 12 with a Brown & Sharp No. 225 ball micrometer and a Mituyo Digimatic 6" capipar, wherein can 12 is slit open, laid flat, and an average of at least six different micrometer readings is taken for each of dimensions 15, 17, 19, and 21, the average of each set of measurements falling within the corresponding specification given in Table 1.

Zinc anode 12 of FIGS. 1 and 2 is most preferably fabricated in accordance with the deep drawing method set forth infra, but may also be made in accordance with the less preferred methods of impact extrusion, or rolling and soldering, also described infra.

Figure 3:
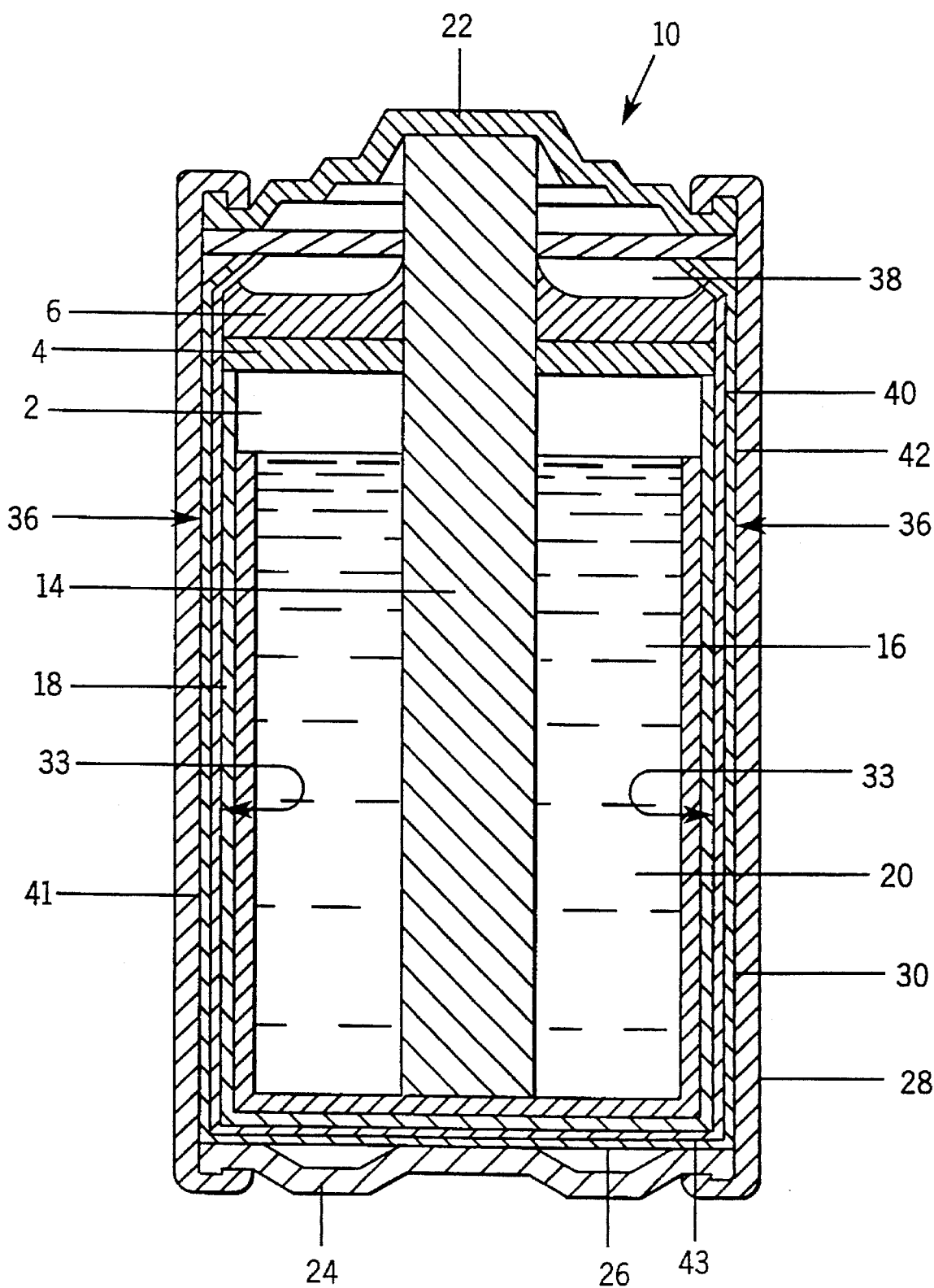
FIG. 3 is a cross-sectional view of a second embodiment of a round LeClanche cell of the present invention, wherein the inner zinc can contains no more than about 12 ppm iron by weight.

FIG. 3 is a cross-sectional view of a second embodiment of a round LeClanche cell of the present invention, wherein inner zinc can 40 contains no more than about 12 ppm iron by weight. In FIG. 3, can 41 comprises inner zinc can 40 and outer can 42. Outer can 42 may comprise zinc, steel or any other suitable metal or alloy, or optionally, may comprise any other suitable electrically conductive material such as plastic or graphite. Inner zinc can 40 physically engages, and is in electrical contact with, outer can 42, and may form an insert can or sleeve that frictionally or otherwise engages the inner sidewall of outer can 42. Inner zinc can 40 has a bottom 43, the bottom being contiguous at its outer perimeter with inner sidewall 33 of inner zinc can 40. Optionally, inner zinc can 40 may have no bottom 43, but may form a sleeve or cylinder having open top and bottom ends.

Can 41 of FIG. 3 may be formed by pressing together two metal sheets, most preferably at temperatures or pressures sufficient to cause some bonding or welding together of the metal sheets, wherein a first zinc alloy sheet containing no more than about 12 ppm iron subsequently forms inner can 40, and a second metal sheet subsequently forms outer can 42. Can 41 may then be formed by any one of the deep drawing, impact extrusion, or rolling processes discussed below. Alternatively, inner zinc can 40 and outer can 42 may first be formed separately by deep drawing means, followed by inner zinc can 40 being press fitted into outer can 42 to form can 41.

Figure 4:
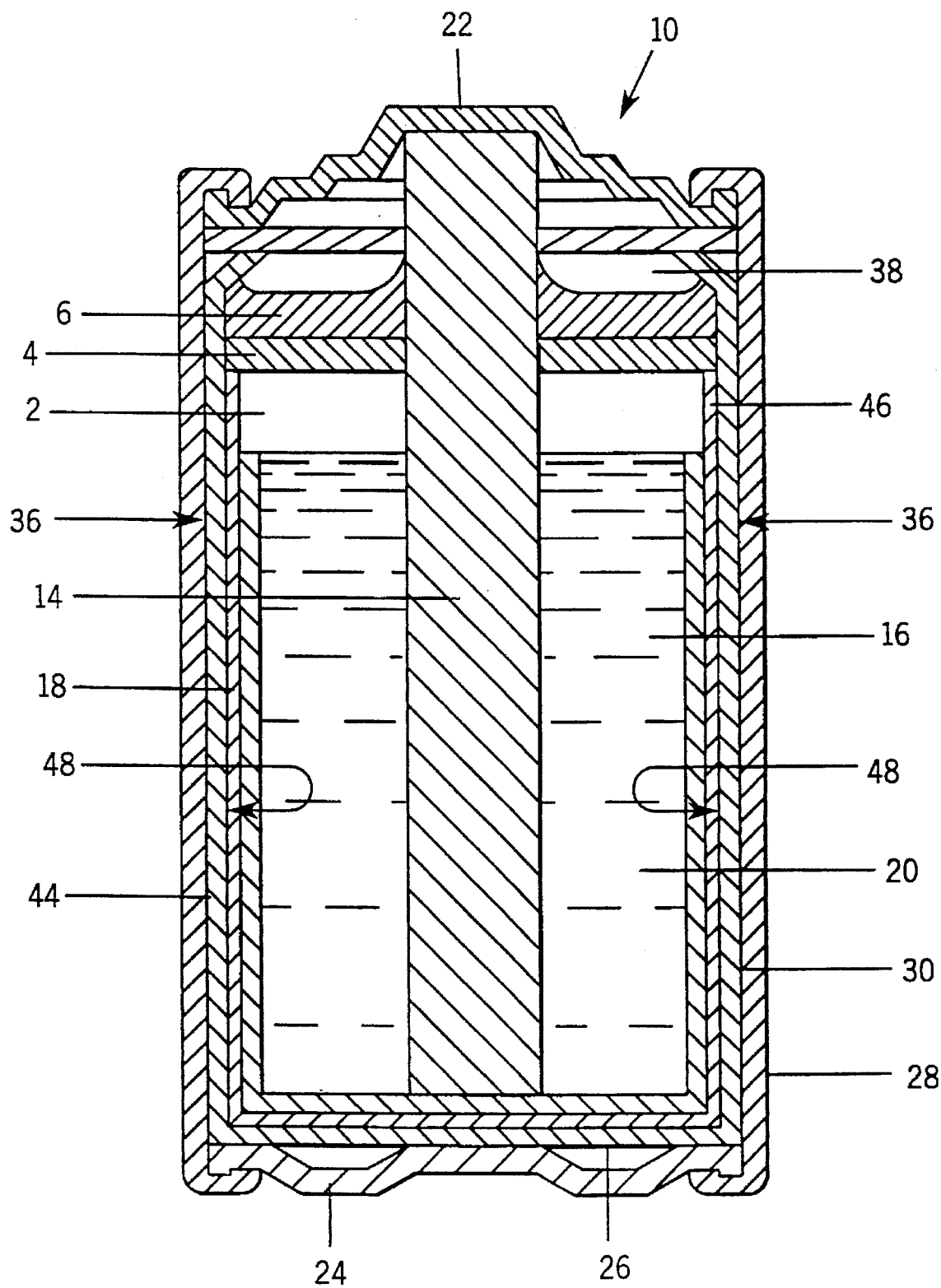
FIG. 4 is a cross-sectional view of a third embodiment of a round LeClanche cell of the present invention, wherein the can has a zinc plating disposed on the inner sidewall thereof, the plating containing no more than about 12 ppm iron by weight.

FIG. 4 is a cross-sectional view of a third embodiment of a round LeClanche cell of the present invention, wherein can 44 has zinc plating 46, the plating containing no more than about 12 ppm iron by weight, and being disposed on the inner sidewall 48 of can 44. In the third embodiment, can 44 may comprise zinc or, optionally, may comprise any other suitable metal or alloy. Zinc plating 46 physically engages, and is in electrical contact with, inner sidewall 48 of can 44.

Zinc plating 46 may be deposited upon inner sidewall 48 of can 44 by any one of several well known electroplating processes. For example, electrodeposition of the zinc alloy of plating 46 may be obtained in a suitable electrolyte solution, wherein can 44 serves as an electroplating cathode in such suitable electrolyte solution, and direct current is introduced through an electroplating zinc alloy anode containing no more than about 12 ppm by weight iron. Zinc plating 46 may be disposed on any suitable electrically conductive material.

Figure 5:
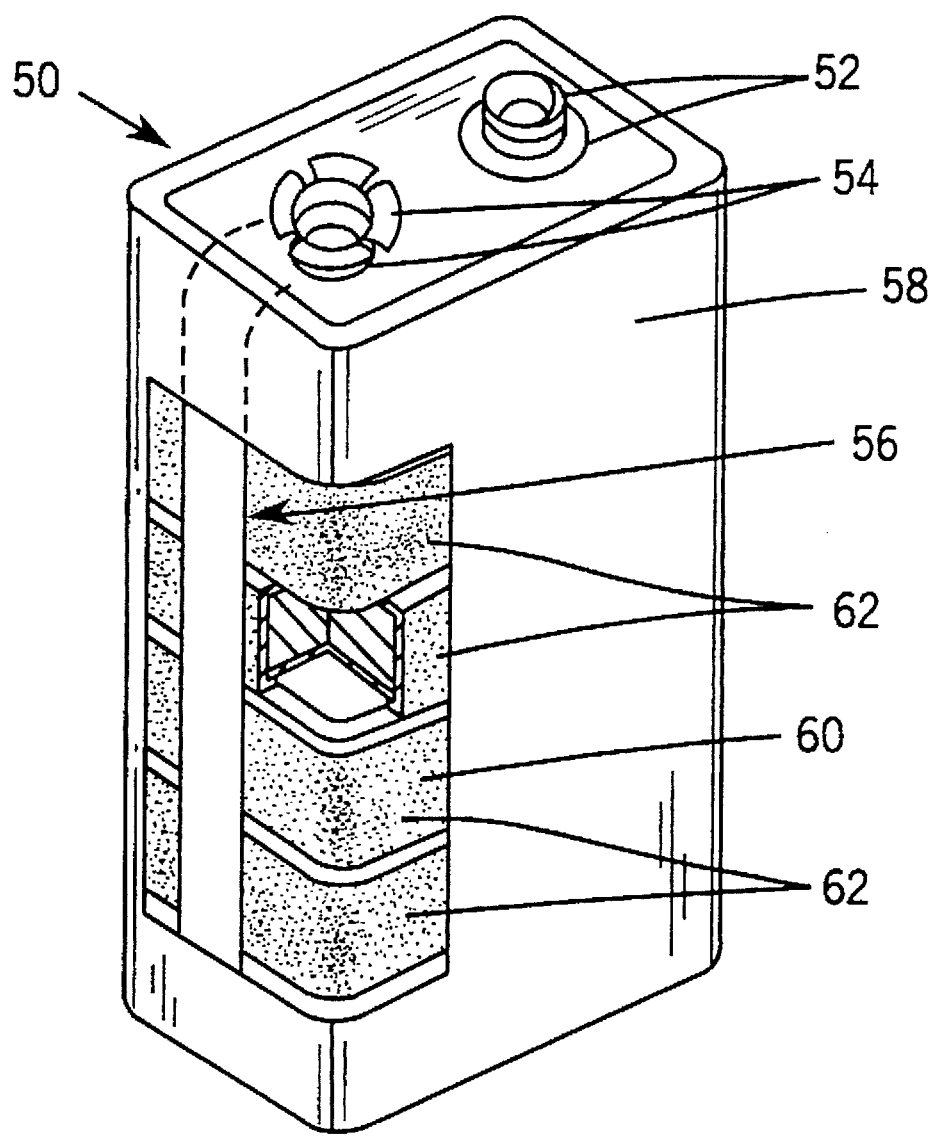
FIG. 5 is a perspective view of an embodiment of a flat cell LeClanche battery of the present invention, wherein the zinc anodes of the unit LeClanche cells thereof contain no more than about 12 ppm iron by weight.

FIG. 5 is a perspective view of a flat cell LeClanche battery 50 of the present invention. Flat cell battery 50 has a plurality of unit flat cells 62, one disposed atop the other therewithin, the unit flat cells 62 being connected electrically in series to positive contact 52 and negative contact 54. Connector strip 56 connects negative contact 54 to the zinc anode of the lowermost of unit flat cells 62, the zinc anode containing no more than about 12 ppm iron by weight. Outer jacket 58 is electrically insulated from the plurality of unit flat cells 62. Wax coating 60 provides a seal for the battery. Typically, six unit flat cells 62 are connected in series to form a 9-volt battery of the type shown in FIG. 5.

Figure 6:
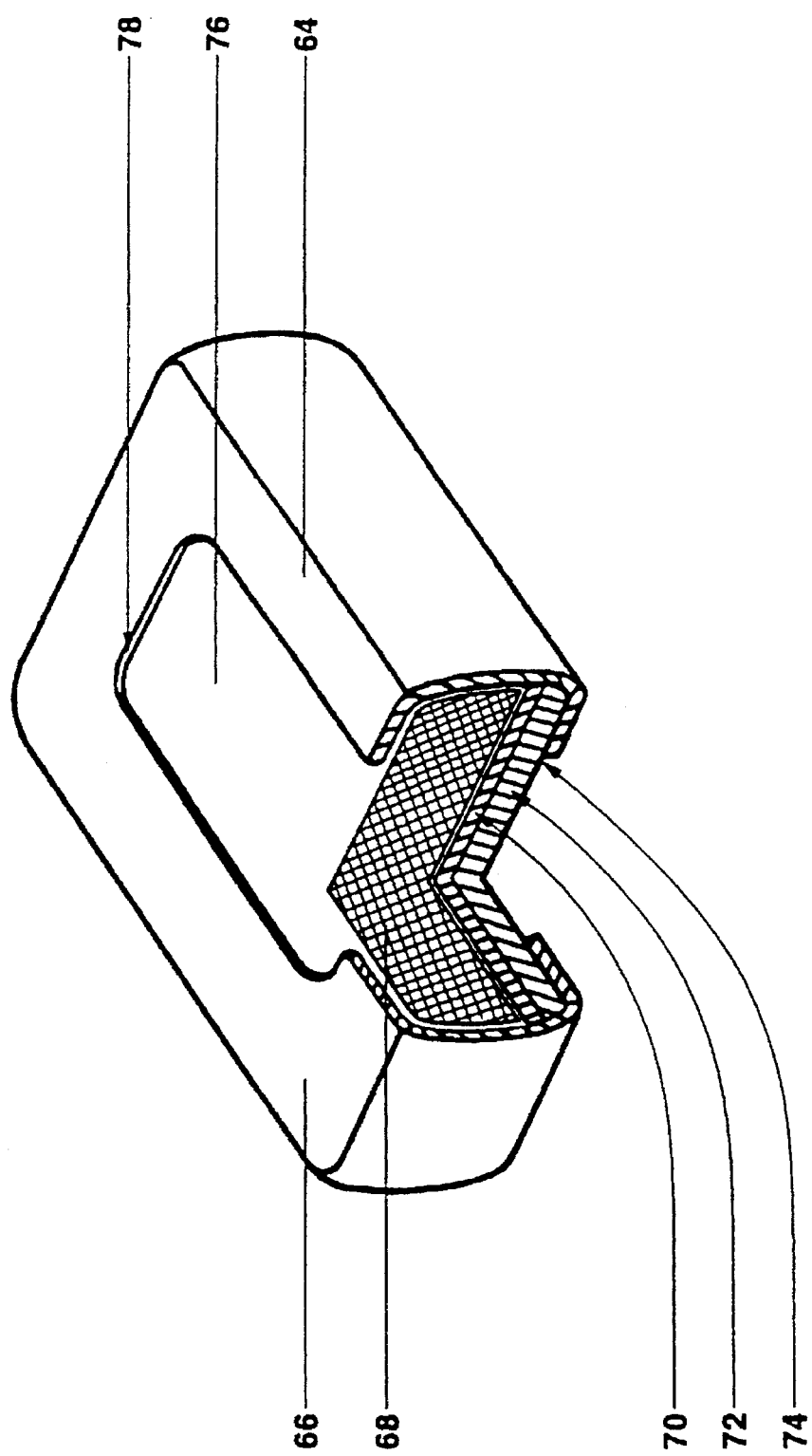
FIG. 6 is an enlarged perspective view of a unit LeClanche cell of the flat cell LeClanche battery of FIG. 5.

FIG. 6 is an enlarged perspective view of one of the unit flat cells 62 of FIG. 5. Plastic envelope 66 has upper aperture 76, wherein outer perimeter 78 defines the lateral extent of upper aperture 76. Plastic envelope 66 has a lower aperture disposed on the bottom side thereof having the same dimensions as the upper aperture, the outer perimeter of the lower aperture being aligned vertically below outer perimeter 78 of top aperture 76.

Several components of flat unit cell 64 are disposed within plastic envelope 66, including cathode mix 68, separator 70, and zinc anode 72. Cathode mix 68 comprises manganese dioxide, a carbon binder, and an electrolyte. Most preferably, cathode mix 68 contains about 9.64% by weight acetylene black compressed by 50%, about 53.32% by weight electrolytic manganese dioxide, about 1.28% by weight ammonium chloride, about 17.41% by weight zinc chloride solution, and about 25.19% by weight water. The upper surface of cathode mix 68 is exposed through upper aperture 76 to permit electrical contact of cathode mix 68 with conductive carbon coating 74 of the unit cell immediately adjacent thereabove. Separator 70, typically cereal coated Kraft paper or the like, is disposed between cathode mix 68 and zinc anode 72.

Zinc anode 72 serves as the anode of the flat unit cell, and forms a rectangular member having substantially flat opposing major upper and lower surfaces, wherein the major upper surface contacts separator 70 and the major lower surface has conductive carbon coating 74 disposed thereupon. Conductive carbon coating 74 is exposed through the lower aperture to permit the coating to function as a current collector for the cathode mix of the unit cell disposed immediately therebelow. Zinc anode 72 of the present invention contains no more than about 12 ppm iron by weight.

Zinc alloy sheets from which zinc anode 72 is formed may be manufactured in accordance with the process for making a zinc alloy set forth below. Typically, zinc anode 72 is then stamped, die-cut, or otherwise formed from the zinc alloy sheets produced in accordance with the present invention.

Mercury is eliminated or substantially reduced from cells, batteries, and zinc anodes of the present invention. Unexpectedly, the present invention provides a mercury-free or substantially mercury-free LeClanche cell or battery having performance, capacity, and storage characteristics exceeding or at least matching those of prior art LeClanche cells or batteries containing mercury, and zinc anodes therefor. The present invention also provides a LeClanche cell or battery having a zinc anode containing substantially reduced amounts, in combination, of lead and cadmium, in respect of prior art LeClanche cells, LeClanche batteries, and zinc anodes therefor.

For many years lead levels of at least about 2000 ppm by weight, and more commonly levels of at least about 3000 ppm by weight, were believed to be required in zinc cans of LeClanche cells to impart sufficient malleability and workability to the zinc alloy sheets from which extruded zinc cans were made. Some workability beyond that provided by conventional zinc was also thought to be required in zinc alloy sheets from which rolled or deep drawn zinc cans were made, wherein lead levels of between about 500 and 1000 ppm by weight were common in combination with between about 1000 ppm and 3000 ppm by weight cadmium.

Reducing iron content in zinc anodes of the present invention to 12 ppm or less by weight appeared to permit a dramatic lowering of the threshold minimum amount of lead required in the zinc alloy used to manufacture the zinc anode. Reducing iron content also appeared to maintain desirable cell performance, capacity, and storage characteristics. Surprisingly, it was discovered that the lead content of the zinc alloy could be reduced to a level below about 800 ppm by weight, or even down to about 20–40 ppm by weight, even when cadmium concentrations lower than 30 ppm by weight were present in the alloy. Because it is toxic, the dramatic reduction in lead content in zinc anodes afforded by the present invention benefits the environment.

For many years cadmium levels of as low as 300 to 800 ppm by weight, but more typically between about 1000 ppm by weight and about 3000 ppm by weight were believed to be required in zinc cans of LeClanche cells to impart sufficient strength and zinc corrosion resistance to the zinc alloy sheets from which such cans were made during the processes of deep drawing, impact extrusion, or rolling.

It was discovered that reducing the iron content of the zinc anode of the present invention to 12 ppm or less by weight also appeared to permit a dramatic lowering of the threshold minimum amount of cadmium required to manufacture the zinc alloy from which the zinc anodes of the present invention were fabricated. Furthermore, it appeared that the present invention permitted desirable cell performance, capacity, and storage characteristics to be maintained, despite the low cadmium content of the zinc anodes thereof. Surprisingly, it was discovered that the cadmium content of the zinc alloy from which zinc anodes were fabricated could be reduced to a level below about 200 ppm by weight, or even down to less than about 30 ppm by weight. Like lead, cadmium is toxic, and therefore the significant reduction of cadmium content in zinc anodes afforded by the present invention benefits the environment.

It was further discovered that small amounts of magnesium and manganese could be substituted for cadmium to impart greater strength and corrosion resistance to the zinc alloy from which zinc anodes of the present invention are made. Additionally, it was discovered that trace amounts of nickel, cobalt, molybdenum, antimony, and arsenic in the zinc alloy impaired battery performance. Thus, the presence of those metals in the zinc anodes of the present invention should be minimized.

In one embodiment of the present invention, the zinc alloy of the present invention from which the zinc anode of the present invention is fabricated consists essentially of the constituents set forth in Table 2, in the amounts shown.

TABLE 2

First Embodiment of the Zinc Alloy of the Present Invention

| Zinc Alloy Constituent | Constituent Content (ppm by weight, n) |
|---|---|
| Iron | $0 \leq n \leq 8$ |
| Cadmium | $0 \leq n \leq 30$ |
| Lead | $600 \leq n \leq 800$ |
| Magnesium | $6 \leq n \leq 15$ |
| Manganese | $60 \leq n \leq 150$ |
| Copper | $0 \leq n \leq 5$ |
| Nickel | $0 \leq n \leq 0.5$ |
| Cobalt | $0 \leq n \leq 0.1$ |
| Molybdenum | $0 \leq n \leq 1$ |
| Antimony | $0 \leq n \leq 1$ |
| Arsenic | $0 \leq n \leq 1$ |
| Aluminum | $0 \leq n \leq 1$ |
| Indium | $0 \leq n \leq 1$ |
| Bismuth | $0 \leq n \leq 1$ |
| Calcium | $0 \leq n \leq 1$ |
| Zinc | Balance |

In a second embodiment of the present invention having broader ranges of constituent contents, the zinc alloy of the present invention from which the zinc anode of the present invention is fabricated consists essentially of the constituents set forth in Table 3, in the amounts shown.

TABLE 3

Second Embodiment of the Zinc Alloy of the Present Invention

| Zinc Alloy Constituent | Constituent Content (ppm by weight, n) |
|---|---|
| Iron | $0 \leq n \leq 12$ |
| Cadmium | $0 \leq n \leq 1000$ |
| Lead | $0 \leq n \leq 6000$ |
| Magnesium | $0 \leq n \leq 100$ |
| Manganese | $0 \leq n \leq 600$ |
| Copper | $0 \leq n \leq 200$ |
| Nickel | $0 \leq n \leq 10$ |
| Cobalt | $0 \leq n \leq 5$ |
| Thallium | $0 \leq n \leq 1000$ |
| Molybdenum | $0 \leq n \leq 5$ |
| Antimony | $0 \leq n \leq 5$ |
| Arsenic | $0 \leq n \leq 5$ |
| Aluminum | $0 \leq n \leq 8000$ |
| Indium | $0 \leq n \leq 8000$ |
| Bismuth | $0 \leq n \leq 8000$ |
| Calcium | $0 \leq n \leq 8000$ |
| Zinc | Balance |

The process of manufacturing the zinc anode of the present invention comprises three basic steps:

- melting a zinc alloy starting material having an iron content of no more than about 12 ppm by weight, and adding desired constituents, if any, to the resulting melt;
- casting and rolling, or otherwise forming, the zinc alloy produced in of the first step into a zinc alloy calot or sheet, and
- fabricating the zinc anode of the present invention from the zinc alloy calot or sheet produced in the second step.

In the first step, the starting material is melted in a suitable container having a refractory or other liner that does not permit susceptible iron to contact, or migrate into, the melt. The pot needs to reach temperatures sufficient to melt the starting material and any additional constituents of the zinc alloy, and thus may be set in a furnace. The furnace may be of the reverberatory type fired by gas or oil. Alternatively, a low frequency or high frequency induction furnace may be used. As required, constituents other than zinc may be added to the furnace for incorporation into the melt. If the heating method used does not agitate the melt by convection current or other means sufficiently to ensure even distribution of the added constituents throughout the melt, the melt should be stirred or agitated to effect even distribution. The furnace should hold the zinc alloy melt at a temperature between about 830° and 950° F., depending on metal analysis and casting requirements.

It was determined that contamination of the zinc alloy by iron occurred almost entirely during the first step when the alloy is molten. Thus, successful practice of the present invention seems to require close attention to the first step because performance, capacity, and storage characteristics of cells and batteries of the present invention improve markedly, and in direct relation to the amount by which the iron content of the zinc anode thereof is reduced; provided, however, that the resulting zinc anode contains less than about 12 ppm by weight iron.

It was also determined that many types of industrial tools, containers, handling vessels, transport conduits, and the like used in the first and second steps contain susceptible iron. While the zinc alloy is in a molten state, steps should be taken to minimize contact between the alloy and any iron that is susceptible to migrating into the melt. By limiting contact between the molten zinc alloy and susceptible iron, migration of susceptible iron into the melt is minimized or, even more preferably, eliminated entirely.

Contact between the molten zinc alloy and susceptible iron may be controlled by using iron-containing devices that are generally not susceptible to the migration of iron therefrom into the molten zinc alloy, or by providing appropriate coatings or linings on iron-containing devices that would otherwise be susceptible to the migration of iron therefrom into the molten or heated zinc alloy. For example, appropriate coatings, linings, and materials for preventing the migration of iron into the molten zinc alloy include, but are not limited to, graphite, 304 Stainless Steel, and refractory materials.

Upon completion of the first step, the iron content of the zinc alloy is the same or only slightly elevated in respect of the iron content of the zinc ingots used as the starting material. By preventing contamination of the molten zinc alloy by susceptible iron, the iron content of the subsequently fabricated zinc anode is typically no more than about 1 to about 4 ppm greater than the iron content of the zinc starting material.

Absent measures to separate iron from the zinc alloy during the second or third steps, the iron content of the fabricated zinc anode cannot be less than the iron content of the starting material. Thus, the iron content of the starting material must be controlled in the first step. As a starting material, zinc ingots having an iron content as low as about 2 ppm by weight are readily and economically obtained. Accordingly, such low iron content in the starting material is preferred, provided such starting material may be procured at a suitable price.

In the second step, rolling slabs are cast in either open or closed book molds. Open molds generally have fins on the bottom for water cooling, whereas closed molds are air cooled. The casting molds should be lined with refractory of other materials that do not permit the migration of susceptible iron therefrom into the zinc alloy, and should also have clean, smooth surfaces that allow unrestricted shrinkage of the cast slab. The use of mold lubricant should be held to a minimum. Casting temperatures vary with the type of casting and metal analysis, but the normal range is from about 830° to about 950° F. Mold temperatures should vary between about 175° and 250° F., depending on the type of mold used and metal analysis requirements. The pouring of slabs in both open and closed book molds must be at such a rate as to hold turbulence to a minimum, and provide an even flow of metal across the bottom surface of the mold. Slabs cast in open molds must be skimmed immediately to remove surface oxide. Rolling slabs should be cast from about ¾ to about 4 inches thick. The thickness, width, and length of the slabs are determined by the gage and size of the finish-rolled sheet or calot, and the capacity of the rolling equipment used.

Temperatures of rolling slabs delivered to the slab roll should range between about 350° and about 500° F. Reductions on the slab roll should start at about 10 percent and then be increased to about 30 percent as the rolling progresses. The rate of reduction is controlled by metal analysis, roll shape, and mill capacity. Next, slab rolled material is cut into pack sheets, which are then finished at starting temperatures between about 350° and 450° F. in the pack-rolling process. Packs are rolled at light pressures, with a corresponding loss in temperature, to produce zinc alloy sheets or calots. Temperatures of finished packs of zinc alloy sheets or calots vary between about 175° and 250° F., depending on final thickness and metal analysis.

More detailed information concerning the first and second steps may be found at pages 523–533 of the book "Zinc— The Metal, Its Alloys and Compounds," by C. W. Mathewson, published by Reinhold Publishing Corp of New York in 1959, such pages being hereby incorporated by reference herein. For more information concerning rolling, see pages 343–360 of Volume 14 ("Forming and Forging") of the Ninth edition of the "Metals Handbook," edited by Joseph R. Davis, and published by ASM International of Ohio in 1988, such pages being hereby incorporated by reference herein.

The most preferred fabricating process, or third step, for manufacturing the round cells of the present invention is to make zinc cans by deep drawing means, wherein the zinc alloy sheet produced in the second step is fed through about eight in-line tool and die stations. At each station the zinc alloy sheet is stamped by a tool into a die. Progressing from first station to last, the can is drawn deeper at each station as the dies become progressively deeper and the diameter of the zinc can decreases. Upon emerging from final tool and die station the zinc can has been formed. Much more detailed information concerning the preferred deep drawing process of the third step may be found at pages 575–590 of Davis, supra, such pages being hereby incorporated by reference herein.

Another means of making round cell zinc cans of the present invention is to take a zinc alloy calot of circular or octagonal shape and containing no more than about 12 ppm iron by weight, and form therefrom a zinc can by impact extrusion means, otherwise commonly referred to as reverse extrusion. After completing the impact extruding step: excess zinc should be trimmed from the zinc can. Care must be taken in the impact extruding step to form zinc cans having sidewalls of sufficient thickness to form a strong can. More information concerning extrusion may be found at pages 301–326 of Davis, supra, in the Meeus reference, supra, and at pages 559–560 of Mathewson, supra, such pages being hereby incorporated by reference herein Yet another, but less preferred, method of making zinc cans of the present invention is to cut a rectangular piece of metal from a sheet of zinc alloy containing no more than about 12 ppm iron by weight, and roll the piece to form a cylinder of appropriate dimensions. A circular piece is cut from the zinc alloy sheet of such dimensions as to fit in the bottom of the cylinder. The seam in the sidewall of the cylinder is then soldered together, and the bottom circular piece is soldered in place. The foregoing steps result in the formation of an upstanding zinc can having a closed bottom. This is not the most preferred method of making zinc cans of the present invention because the solder required to close the seams of the can usually contains substantial amounts of lead. As mentioned above, lead is undesirable for environmental reasons. More information concerning this method of making zinc cans may be found at pages 555–559 of Mathewson, supra, such pages being hereby incorporated by reference herein.

The further the iron content of the zinc anode is reduced below 12 ppm by weight, the greater becomes the cost of effecting the iron reduction. Thus, some balance should be struck between battery performance and the cost of reducing iron content. It was determined that the cost of reducing the iron content of the zinc anodes of the present invention below 1 ppm iron by weight seemed to outweigh benefits in cell performance achieved through so doing; zinc ingots for starting material having an iron content of 1 ppm or less by weight are difficult to obtain and expensive.

To reduce the cost of manufacturing the zinc anode of the present invention, the anode should have an iron content of at least about 1.5 to 2 ppm by weight. Such iron contents permit some relaxation of the strict controls that would otherwise be required in the manufacturing process, and thus reduce manufacturing costs. In some embodiments the iron content is preferably at least about 4 ppm by weight, or may be as low as 2 ppm by weight. To the extent the cost of reducing the iron content is at least equally offset by improved cell or battery performance, capacity, or storage characteristics, however, still lower iron contents are preferred.

In weighing the cost of reducing iron content versus improvements achieved in cell or battery performance, capacity, or storage characteristics, it was determined that the iron content of the zinc anodes of the present invention should preferably be no more than about 10 or 11 ppm, and most preferably should not exceed about 8 ppm.

All iron, lead, cadmium and other metal constituent contents set forth herein were determined using a combined digestion and graphite furnace atomic absorption technique (hereinafter referred to as the "DGFAA technique"). The DGFAA technique comprised the following steps for determining the amount of a given constituent in a zinc can sample.

A Hitachi Model Z-8100 polarized Zeeman atomic absorption spectrophotometer (hereinafter referred to as a "Z-8100") manufactured by Hitachi, Ltd. of Tokyo, Japan, was used to measure concentrations of iron, lead, and cadmium present in zinc can samples. When concentrations of iron, lead, or cadmium in a sample were expected to exceed about 50 ppm, the Z-8100 was used in flame mode. When concentrations of iron, lead, or cadmium in a sample were expected to be less than about 50 ppm, the Z-8100 was used in graphite furnace mode.

Helpful information concerning techniques for measuring ppm of iron, lead, and cadmium in zinc can samples using the Z-8100 may be found at pages 4–29, 4–50, and 4–21, respectively, of the guidebook "Graphite Atomization Analysis Guide for Polarized Zeeman Atomic Absorption Spectrophotometry," Part No. 171-9136 YY-T (HTT-LT), published in 1988 by Hitachi, Ltd. in Tokyo, Japan, such pages being hereby incorporated by reference herein. Other, more general information concerning graphite furnace atomic absorption spectrometry may be found at pp. 1–106 in "Applications of Zeeman Graphite Furnace Atomic Absorption Spectrometry in the Chemical Laboratory and in Toxicology," edited by C. Minoia and S. Caroli, published by Pergamon Press, Ltd., Headington Hill Hall, Oxford, England in 1992, and hereby incorporated by reference herein.

A one gram sample of a zinc can was digested in a solution of 8 milliliters of ultra-pure Fischer trace metal grade nitric acid and 10 milliliters of purified water. The purified water was processed in a Milli-Q Water Purification System manufactured by Millipore Corporation located in Bedford, Mass., wherein the system produced Type I reagent grade water. Nitric acid was added to the water in increments of two milliliters until the sample was dissolved, the solution being held in a Teflon digestion vessel. Three such solutions were prepared for each zinc can sample to be tested. The three samples were placed in an MDS-2000 microwave oven manufactured by CEM Corporation of Matthews, North Carolina (hereinafter referred to as an "MDS-2000"), where the solutions were heated to 200° C. over a 20-minute period, and then held at 200° C. for ten minutes. The MDS-2000 was programmed to operate at 65% of maximum power output and a maximum pressure of 170 psi; one of the three samples temperature and pressure was monitored during the microwave heating process. The samples were cooled and transferred to 100 milliliter flasks containing water purified by the Milli-Q for further analysis in an atomic absorption spectrophotometer.

When iron contents below 50 ppm were measured, each sample underwent five sequential steps, all while the Z-8100 was in graphite furnace mode. Those steps, and the physical conditions corresponding to each, are set forth in Table 4 below.

TABLE 4

Steps Used to Measure ppm Iron in Zinc Can Samples

| Z-8100 Step | Step Number | Starting Temperature (deg. °C.) | Ending Temperature (deg. °C.) | Duration (seconds) | Carrier Gas (ml/min) |
|---|---|---|---|---|---|
| Drying | 1 | 80 | 140 | 20 | 200 |
| Drying | 2 | 140 | 140 | 20 | 200 |
| Ashing | 3 | 1300 | 1300 | 30 | 200 |
| Atomizing | 4 | 2850 | 2850 | 5 | 30 |
| Cleaning | 5 | 2900 | 2900 | 10 | 200 |

The Z-8100 was set at the following instrumentation settings when the iron content of a one gram zinc can sample containing less than about 50 ppm of iron was measured: element: Fe; wavelength: 248.3 nm; lamp current: 10 mA; slit: 0.2 nm; cuvette: pyro-platform; temperature control: optical temperature; firings: less than 200; measurement mode: working curve; signal mode: background corrected; calculation: peak area; slicing height: 10%; replicates: 2 standard, 2 samples; no sample blank; time constant of 0.2 seconds; linear calibration curve.

When lead contents below 50 ppm were measured, each sample underwent five sequential steps, all while the Z-8100 was in graphite furnace mode. Those steps, and the physical conditions corresponding to each, are set forth in Table 5 below.

TABLE 5

Steps Used to Measure ppm Lead in Zinc Can Samples

| Z-8100 Step | Step Number | Starting Temperature (deg. °C.) | Ending Temperature (deg. °C.) | Duration (seconds) | Carrier Gas (ml/min) |
|---|---|---|---|---|---|
| Drying | 1 | 80 | 140 | 20 | 200 |
| Drying | 2 | 140 | 140 | 20 | 200 |
| Ashing | 3 | 550 | 550 | 30 | 200 |
| Atomizing | 4 | 2000 | 2000 | 5 | 30 |
| Cleaning | 5 | 2800 | 2800 | 10 | 200 |

The Z-8100 was set at the following instrumentation settings when the lead content of a one gram zinc can sample containing less than about 50 ppm lead was measured: element: Pb; wavelength: 283.3 nm; lamp current: 6 mA; slit: 1.3 nm; cuvette: pyro-platform; temperature control: optical temperature; firings: less than 200; measurement mode: working curve; signal mode: background corrected; calculation: peak area; slicing height: 10%; replicates: 2 standard, 2 samples; no sample blank; time constant of 0.2 seconds; linear calibration curve.

When cadmium contents below 50 ppm were measured, each sample underwent five steps, all while the Z-8100 was in graphite furnace mode. Those steps, and the physical conditions corresponding to each, are set forth in Table 6 below.

TABLE 6

Steps Used to Measure ppm Cadmium in Zinc Can Samples

| Z-8100 Step | Step Number | Starting Temperature (deg. °C.) | Ending Temperature (deg. °C.) | Duration (seconds) | Carrier Gas (ml/min) |
|---|---|---|---|---|---|
| Drying | 1 | 80 | 140 | 20 | 200 |
| Drying | 2 | 140 | 140 | 20 | 200 |
| Ashing | 3 | 1300 | 1300 | 30 | 200 |
| Atomizing | 4 | 2850 | 2850 | 5 | 30 |
| Cleaning | 5 | 2900 | 2900 | 10 | 200 |

The Z-8100 was set at the following instrumentation settings when the cadmium content of a one gram zinc can sample containing less than about 50 ppm cadmium was measured: element: Cd; wavelength: 228.8 nm; lamp current: 8 mA; slit: 1.3 nm; cuvette: pyro-platform; temperature control: optical temperature; firings: less than 200; measurement mode: standard additions; signal mode: background corrected; calculation: peak area; slicing height: 10%; replicates: 2 standard, 2 samples; no sample blank; time constant of 0.2 seconds; linear calibration curve.

Table 7 shows contents of iron, lead, and cadmium contained in zinc samples provided by the NIST (National Institute of Standards and Technology). Two contents are given for each element in the NIST samples: the NIST certified value, and the measured value (e,g., the value measured using the DGFAA technique). In parentheses immediately following each element listed in Table 5 is the NIST SRM (or, NIST Standard Reference Material) number for the zinc alloy sample on which measurements were performed. Each "measured value" was determined using the Z-8100 in graphite furnace mode.

TABLE 7

NIST and Measured Iron, Lead, and Cadmium
Contents in NIST SRM 728 and 631 Zinc Alloy Samples

| Element | NIST Certified Value | Measured Value | Percent Error |
|---|---|---|---|
| Iron (728) | 2.7 ppm | 1.7 ppm | 37.0% |
| Iron (631) | 50 ppm | 60 ppm | 20.0% |
| Lead (728) | 11.1 ppm | 10.9 ppm | 2.0% |
| Cadmium (728) | 1.1 ppm | 1.15 ppm | 5.0% |

Table 7 shows discrepancies between the iron, lead, and cadmium contents measured using the DGFAA technique and the certified contents provided by the NIST. It was concluded that the DGFAA-derived contents were more accurate than those provided by the NIST; the NIST determined iron, lead and cadmium contents of the 631 and 728 SRM zinc alloy samples some twenty years ago using outdated, and less accurate, polography techniques.

All zinc alloy and zinc anode constituent contents set forth in the specification and claims hereof are intended to be determined and interpreted in accordance with the foregoing experimental methods as they apply to a given constituent. Thus, for example, the terms "zinc anode of the present invention" and "zinc alloy of the present invention" as used herein mean that the anode or alloy contains no more than about 12 ppm iron by weight, as measured using the DGFAA techniques described herein.

The heavy duty cells of Examples A-C, E-G, and J-L were made using the internal mix constituents and corresponding amounts shown in Table 8.

TABLE 8

Heavy Duty Cell Internal Mix Constituents and Amounts

| Constituent | Amount (percent by weight of total mix) |
|---|---|
| Acetylene Black, compressed 50% | 8.70% |
| Electrolytic $MnO_2$ | 49.49% |
| Ammonium Chloride | 1.51% |
| Zinc Oxide | 0.33% |
| Zinc Chloride Solution | 16.71% |
| Water (@ 160° F.) | 23.27% |

The general purpose cells of Examples D, H, and I were made using the internal mix constituents and corresponding amounts shown in Table 9.

TABLE 9

Heavy Duty Cell Internal Mix Constituents and Amounts

| Constituent | Amount (percent by weight of total mix) |
|---|---|
| Acetylene Black, compressed 50% | 8.09% |
| Natural $MnO_2$ | 50.48% |
| Ammonium Chloride | 1.46% |
| Zinc Chloride Solution | 15.77% |
| Water (@ 160° F.) | 23.27% |

All heavy duty and general purpose cells of Examples A through L were made in accordance with the structure shown in FIG. 1. None of the cells contained mercury. In Examples A through L, all conventional anodes and all zinc anodes of the present invention contained less than 800 ppm lead, less than 7 ppm cadmium, less than 5 ppm copper, less than 0.2 ppm nickel, and less than 0.02 ppm indium.

EXAMPLE A

Figure 7:
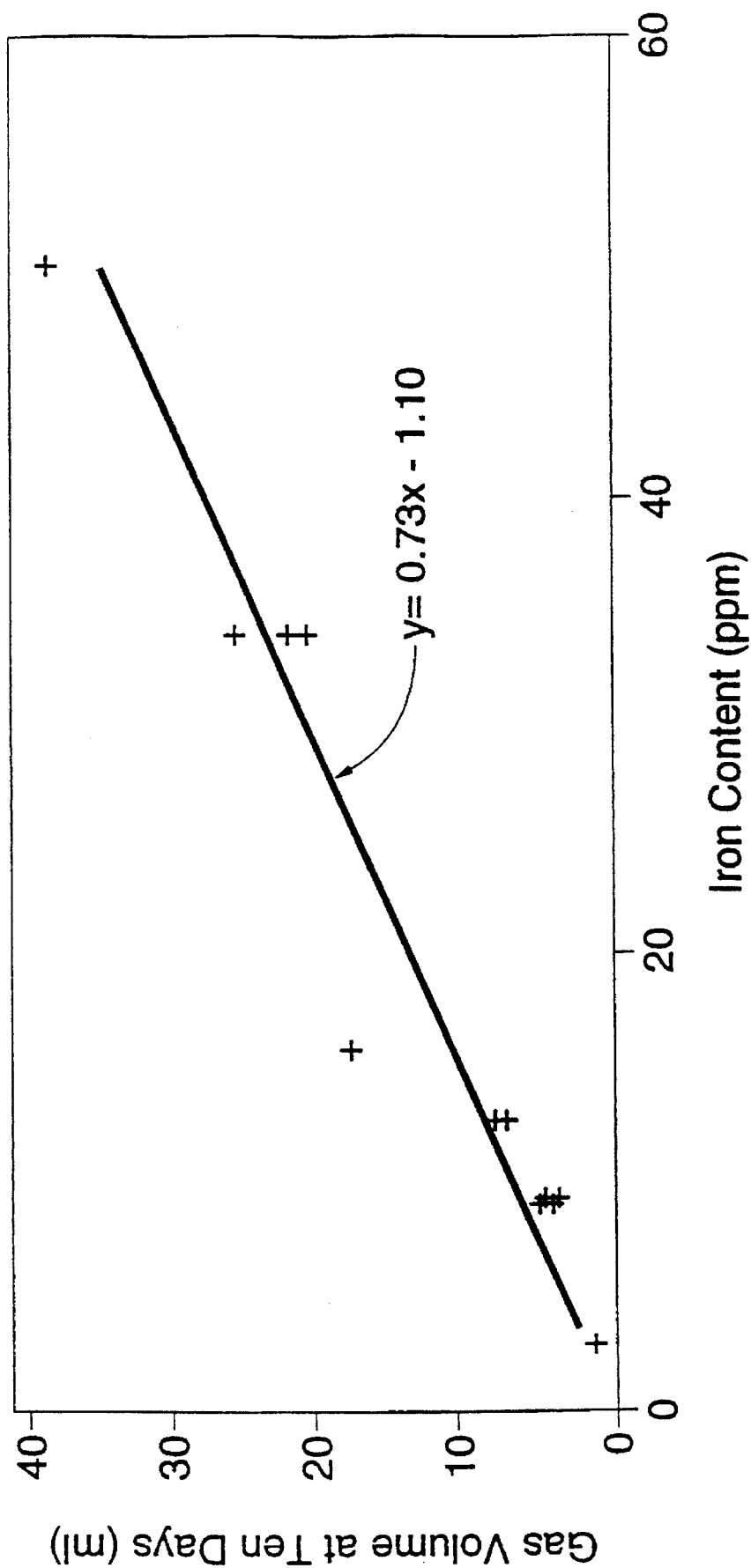
FIG. 7 is a graph of zinc can iron concentration versus hydrogen gas volume data for D-size heavy duty LeClanche cells, including those of the present invention.

FIG. 7 shows the results of measurements obtained using a cell discharge hydrogen gas volume measurement apparatus. The apparatus measured the volume of hydrogen gas generated by discharging Rayovac 6D heavy duty D-size LeClanche cells having zinc cans of varying iron concentrations, including those of the present invention. All cells were discharged in accordance with the 2.2 Ohm LIF test conditions and procedures described in Example B, infra. Using linear regression techniques, a linear equation of the form y=−1.096+0.730 was superimposed on the data points shown in FIG. 7. An $R^2$ correlation coefficient of 0.94 was obtained for the fit between the straight line of FIG. 7 and the data points shown therein. FIG. 7 and a high $R^2$ correlation coefficient show that a strong linear relationship exists between LeClanche cell zinc can iron content and gassing rates.

EXAMPLE B

Figure 8:
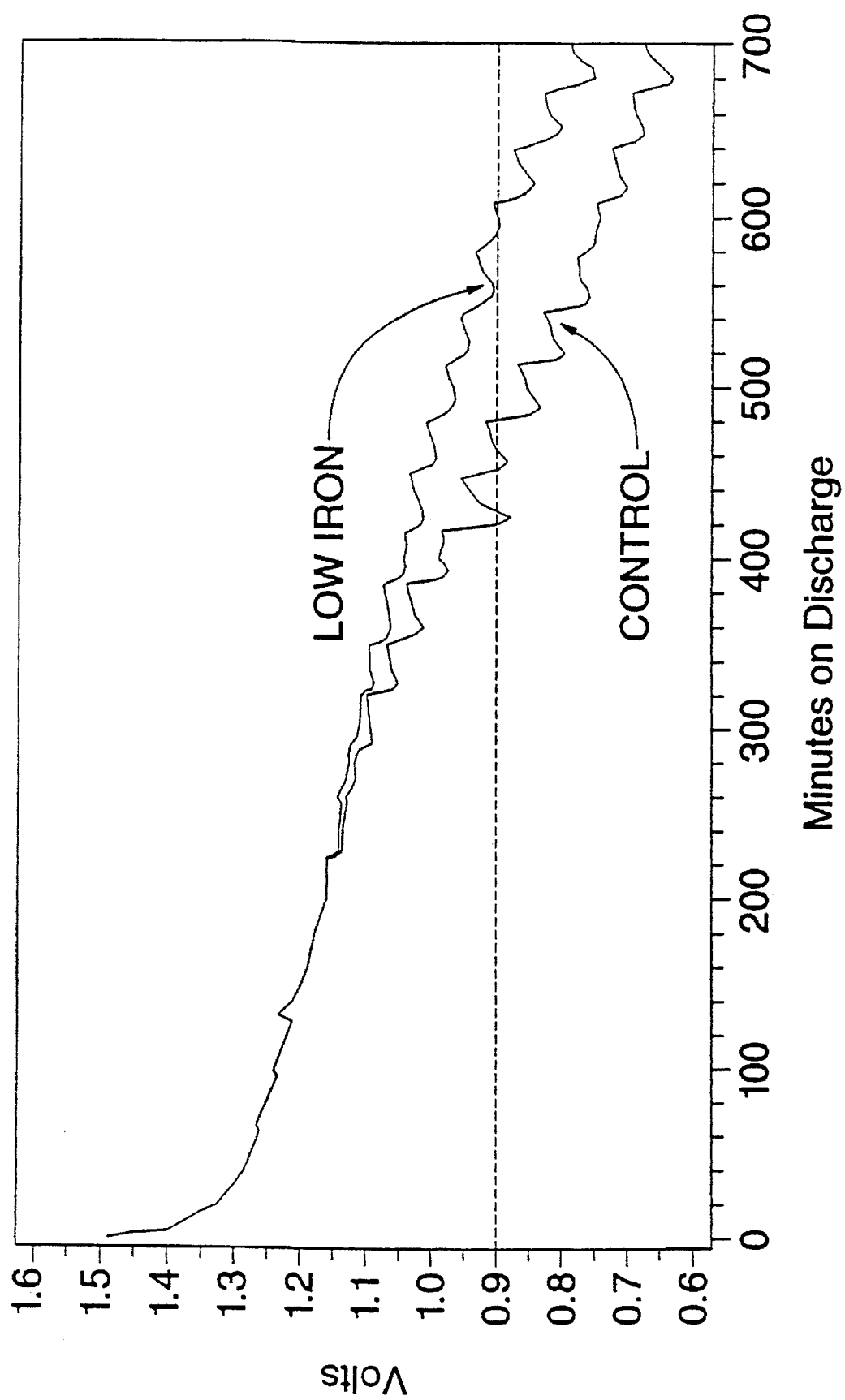
FIG. 8 is a graph of 2.2 Ohm light industrial flashlight test (hereinafter "LIF test") data obtained with conventional D-size heavy duty LeClanche cells and D-size heavy duty LeClanche cells of the present invention.

FIG. 8 shows 2.2 Ohm light industrial flashlight test (hereinafter "2.2 Ohm LIF test") results obtained with conventional Rayovac 6D heavy duty D-size LeClanche cells and Rayovac 6D heavy duty D-size LeClanche cells of the present invention. The LIF tests of Example B used 12 conventional cells having zinc cans containing about 17 ppm iron, and 11 cells of the present invention having zinc cans containing about 6.6 ppm iron.

Each tested cell energized an electrical circuit having a 2.2 ohm resistor load placed thereacross, such load simulating a typical flashlight load. Each circuit had a timed switch means for completing and interrupting the circuit. Using the timed switch means, each circuit was closed, and the battery was discharged thereacross for 4 minutes during each of eight consecutive hours every day. Each cell then rested, or was not discharged, for 16 consecutive hours thereafter. This 24-hour cycle was repeated for each cell until the closed circuit voltage of the cell reached 0.9 volts, whereupon the 2.2 ohm LIF test for that cell was terminated. All 2.2 Ohm LIF tests of Example B were conducted at room temperature.

As mentioned, 12 conventional cells and 11 cells of the present invention of the present invention were tested in the 2.2 Ohm LIF tests of Example B. Closed circuit voltages across each cell were recorded as a function of time during the tests. The average values of those recorded voltages are shown in FIG. 8.

FIG. 8 shows that cells of the present invention did not reach 0.9 volts until after about 600 cumulative minutes of discharge, whereas conventional cells reached 0.9 volts after only about 450 cumulative minutes of discharge. Moreover, the voltage discharge profile of the cells of the present invention is more even and less jagged than that of the conventional cells. FIG. 8 therefore shows the surprising and unexpected result that under 2.2 Ohm LIF conditions D-size heavy duty LeClanche cells of the present invention lasted about one-third longer than did conventional cells.

EXAMPLE C

Figure 9:
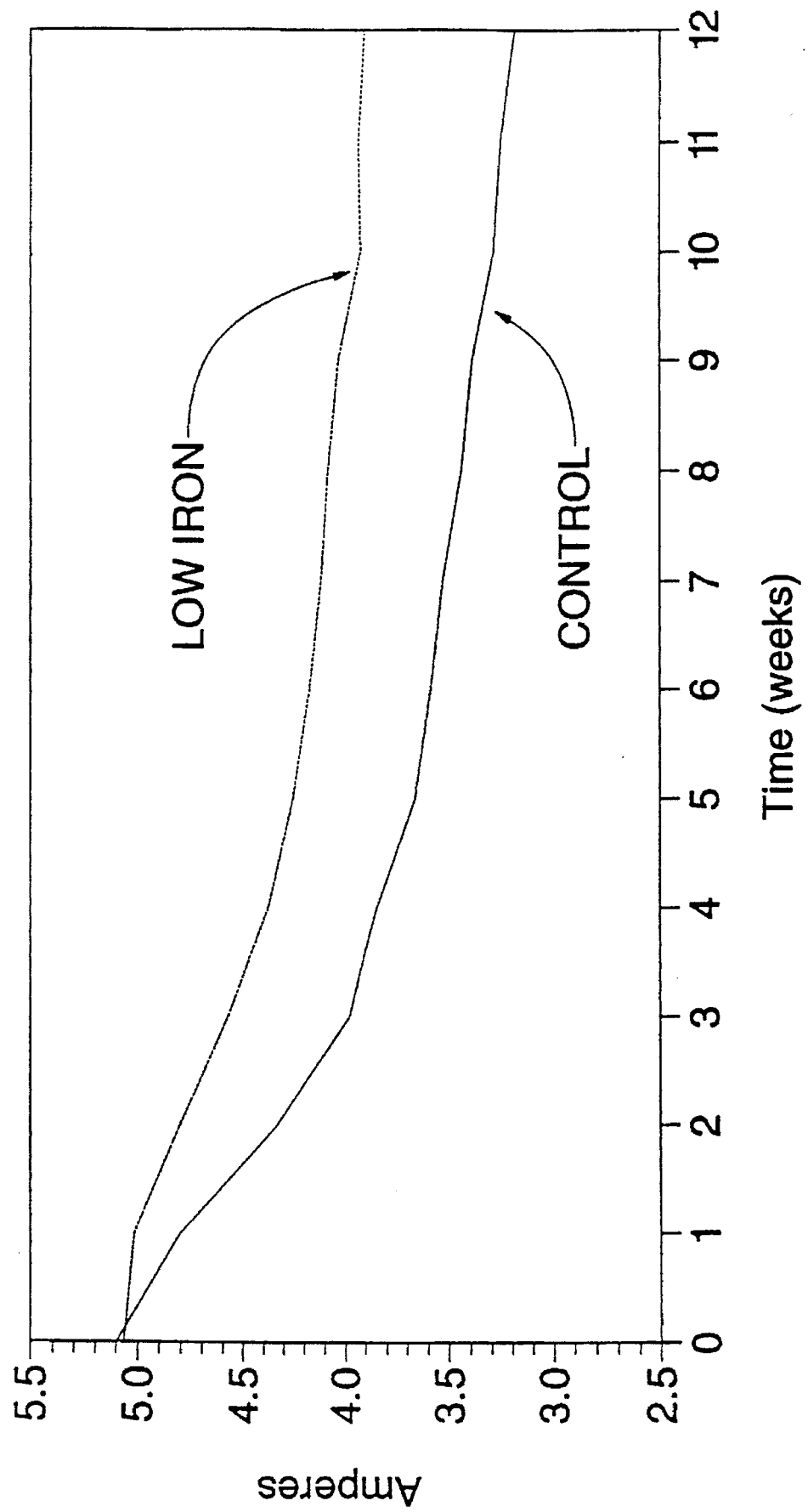
FIG. 9 is a graph of room temperature flash current test (hereinafter RT flash current test) data obtained with conventional D-size heavy duty LeClanche cells and D-size heavy duty LeClanche cells of the present invention.
Figure 10:
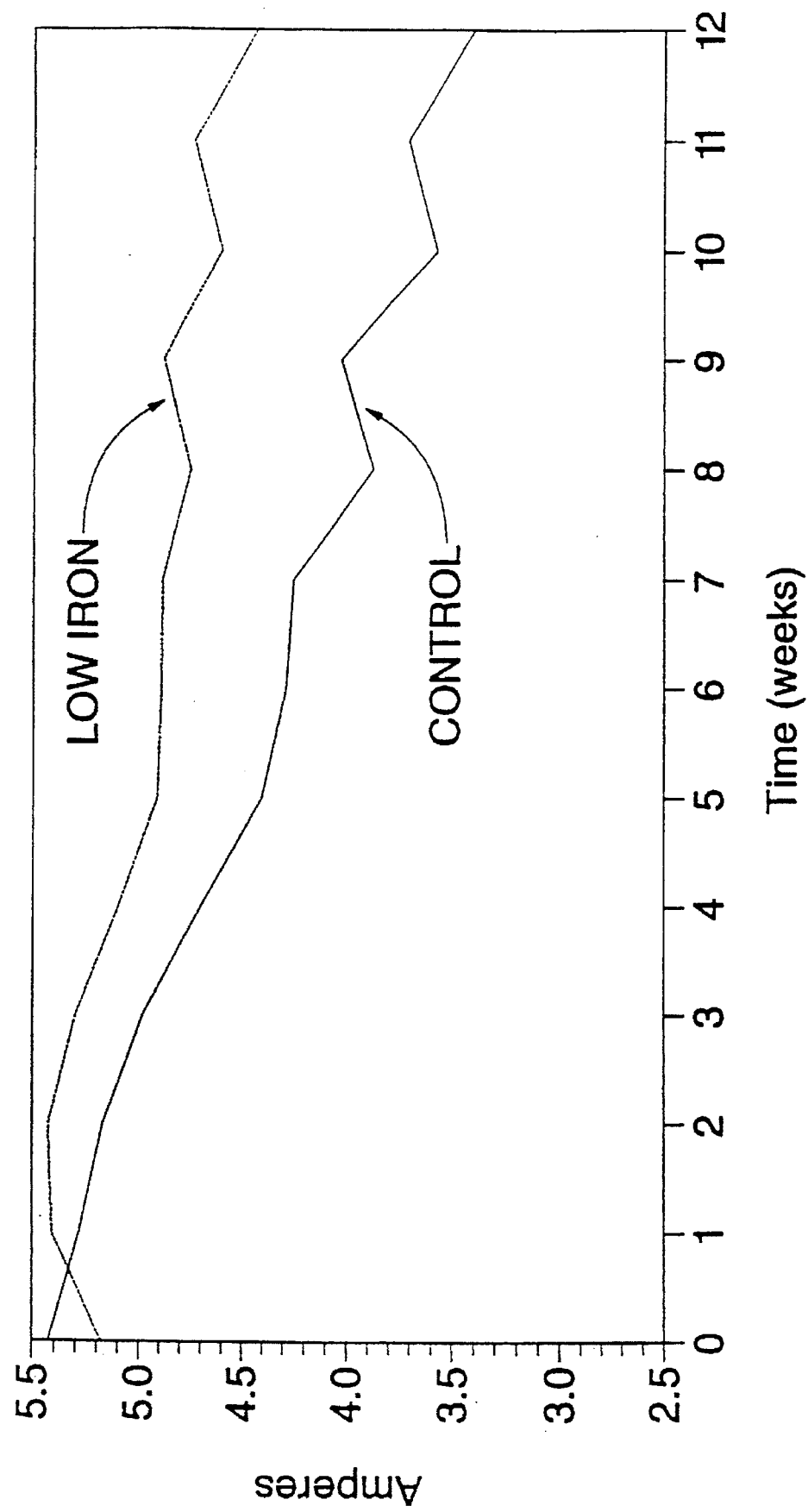
FIG. 10 is a graph of high temperature flash current test (hereinafter HT flash current test) data obtained with conventional D-size heavy duty LeClanche cells and D-size heavy duty LeClanche cells of the present invention.

FIGS. 9 and 10 show room temperature flash current test (hereinafter "RT flash current test") and high temperature flash current test (hereinafter "HT flash current test") results obtained with conventional Rayovac 6D heavy duty D-size LeClanche cells and Rayovac 6D heavy duty D-size LeClanche cells of the present invention. The flash current tests of Example C used 10 conventional cells having zinc cans containing about 17 ppm iron, and 10 cells of the present invention having zinc cans containing about 6.6 ppm iron.

Each cell was placed in storage at room temperature (about 70° F.) for the RT flash current test, or at high temperature (about 113° F.) for the HT flash current test, after having been discharged across a 2.2 Ohm load until its closed circuit voltage equaled 1.0 Volt. (At 1.0 Volts about one-half of a general purpose or heavy duty cell's service life remains.) At one week increments thereafter, each cell was temporarily removed from room or high temperature storage conditions, and the flash current it could deliver was measured using an ammeter. No electrical load was placed in series with the cell and the ammeter while the flash current was being measured over a 0.5 second interval. Each cell was then returned to storage. One week later the flash current measurement process was repeated for each cell.

As mentioned, 10 conventional cells and 10 cells of the present invention were tested in the RT and HT flash current tests of Example C. The flash current delivered by each cell was recorded weekly during the tests. The average values of those recorded flash currents are shown in FIGS. 9 and 10.

FIG. 9 shows that after three months at room temperature cells of the present invention delivered an average of about 0.7 Amperes more than did conventional cells. FIG. 10 shows that after three months at high temperature the cells of the present invention delivered an average of about 1.1 Amperes more than did the conventional cells. Thus, FIG. 9 shows the surprising and unexpected result that under room temperature storage conditions cells of the present invention provided, on average, over 20% more current than conventional cells. FIG. 10 shows a surprising 24% increase in current provided under high temperature conditions by cells of the present invention in respect of conventional cells.

EXAMPLE D

Figure 11:
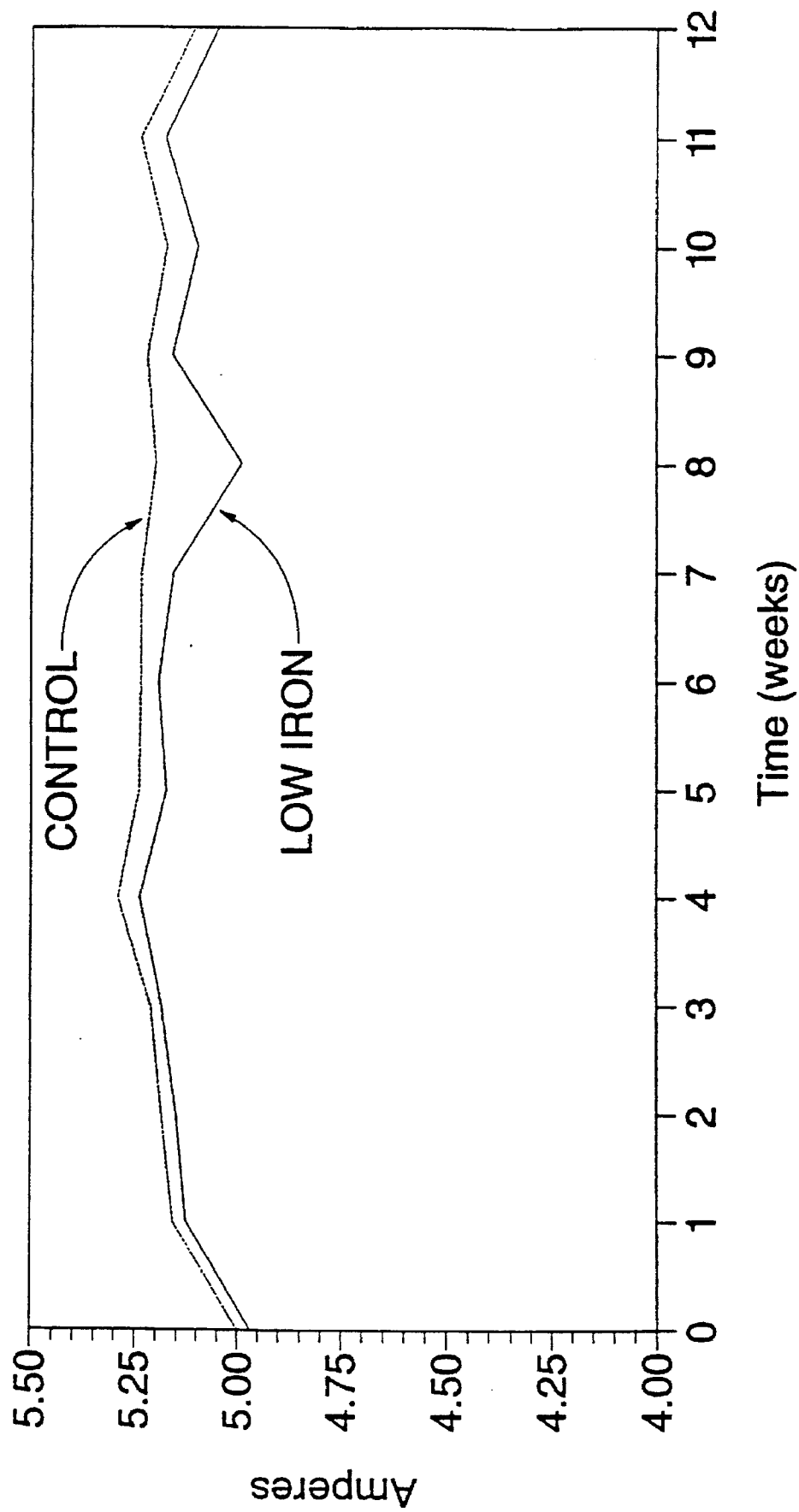
FIG. 11 is a graph of RT flash current test data obtained with conventional D-size general purpose LeClanche cells and D-size general purpose LeClanche cells of the present invention.
Figure 12:
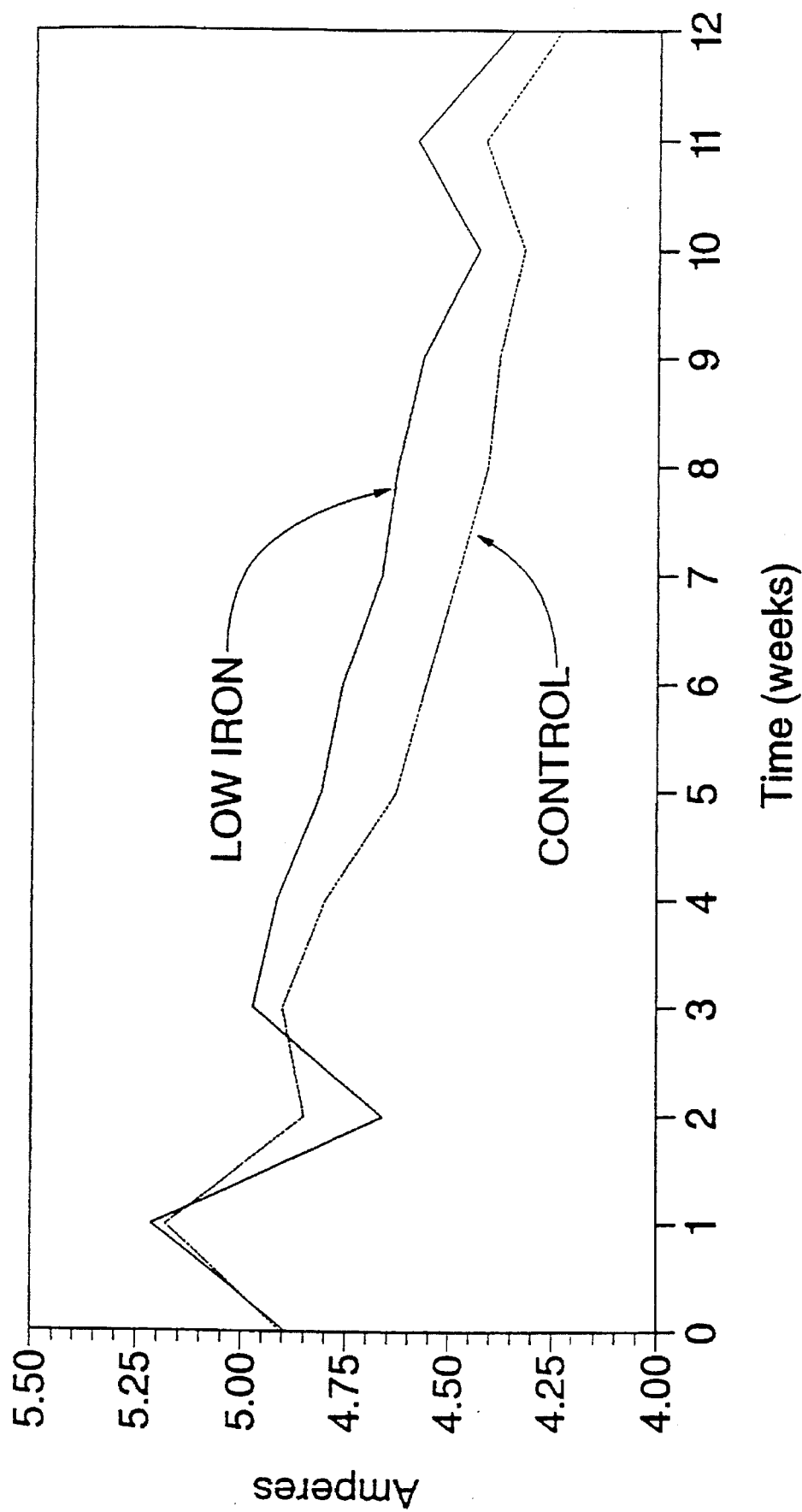
FIG. 12 is a graph of HT flash current test data obtained with conventional D-size general purpose LeClanche cells and D-size general purpose LeClanche cells of the present invention.

FIGS. 11 and 12, respectively, show RT and HT flash current test results obtained with conventional Rayovac 2D general purpose D-size LeClanche cells and Rayovac 2D general purpose D-size LeClanche cells of the present invention. Example D tests used 10 conventional cells having zinc cans containing about 31.8 ppm iron, and 10 cells of the present invention having zinc cans containing about 6.4 ppm iron.

In Example D tests, all cells were tested in accordance with the RT and HT flash current procedures described above in Example C. Average values of the flash currents recorded in the Example D tests are shown in FIGS. 11 and 12 for RT and HT storage conditions, respectively.

FIG. 11 shows that after three months at room temperature, cells of the present invention delivered an average of about 0.05 Amperes less than did conventional cells. FIG. 12 shows that after three months at high temperature cells of the present invention delivered an average of about 0.15 Amperes more than did the conventional cells. Thus, FIG. 11 shows little difference in the current provided by cells of the present invention and conventional cells under room temperature storage conditions. FIG. 12 shows a slight increase in the current provided by cells of the present invention in respect of conventional cells under high temperature conditions.

EXAMPLE E

Figure 13:
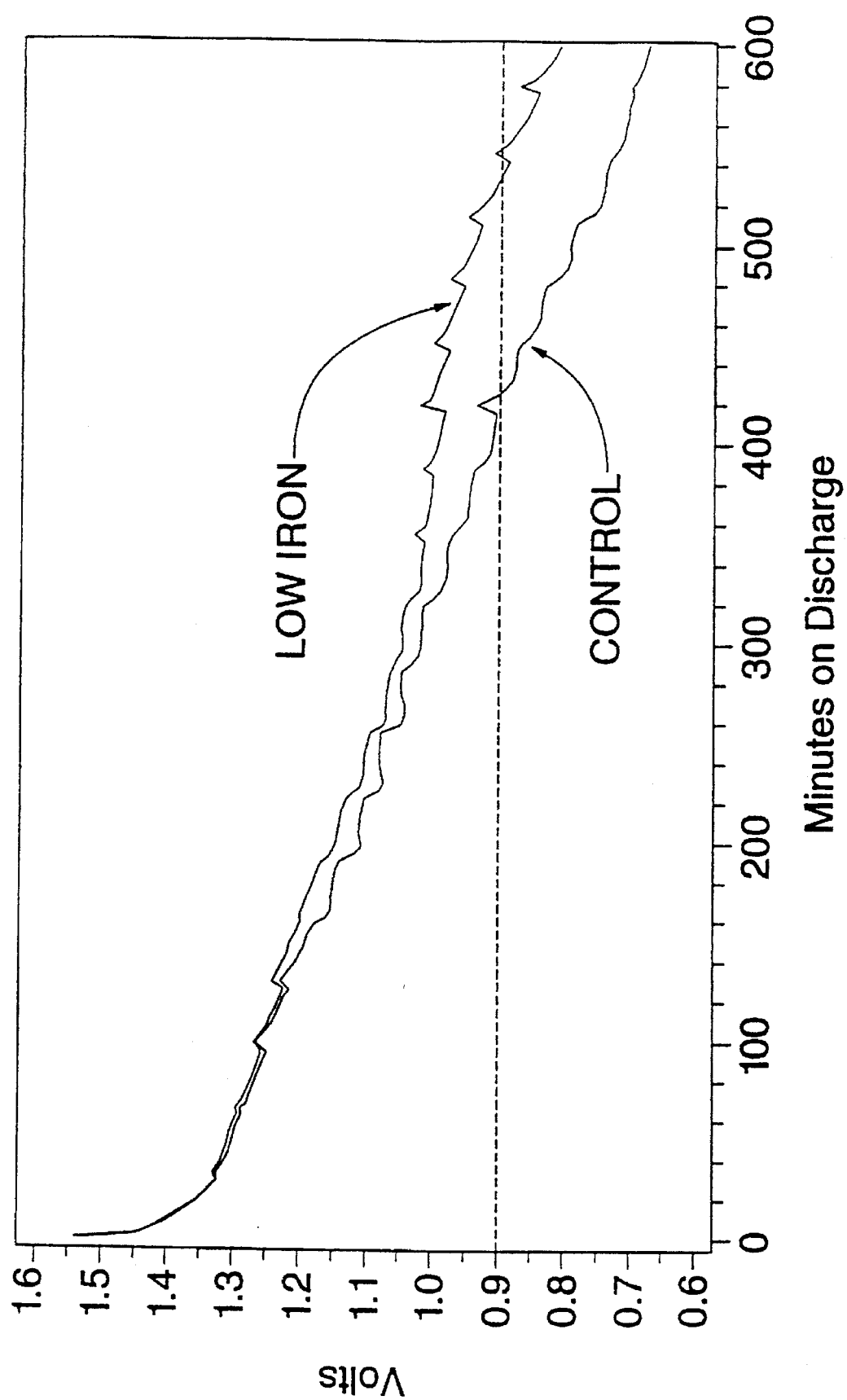
FIG. 13 is a graph of 3.9 Ohm LIF test data obtained with conventional C-size heavy duty LeClanche cells and C-size heavy duty LeClanche cells of the present invention.

FIG. 13 shows 3.9 Ohm LIF test results obtained with conventional Rayovac 4C heavy duty C-size LeClanche cells and Rayovac 4C heavy duty C-size LeClanche cells of the present invention. The LIF tests of Example E used 15 conventional cells having zinc cans containing about 17 ppm iron, and 15 cells of the present invention having zinc cans containing about 6.1 ppm iron.

In Example E tests, all cells were tested in accordance with the LIF test procedures described above in Example B, with the exception that the cells of Example E were discharged across a 3.9 Ohm load. FIG. 13 shows the average values of voltages recorded in the Example E LIF tests.

FIG. 13 shows that cells of the present invention did not reach 0.9 volts until after almost 550 cumulative minutes of discharge, whereas conventional cells reached 0.9 volts after only about 430 cumulative minutes of discharge. FIG. 13 therefore shows the surprising and unexpected result that under 3.9 Ohm LIF conditions C-size heavy duty LeClanche cells of the present invention lasted about 28% longer than did conventional cells.

EXAMPLE F

Figure 14:
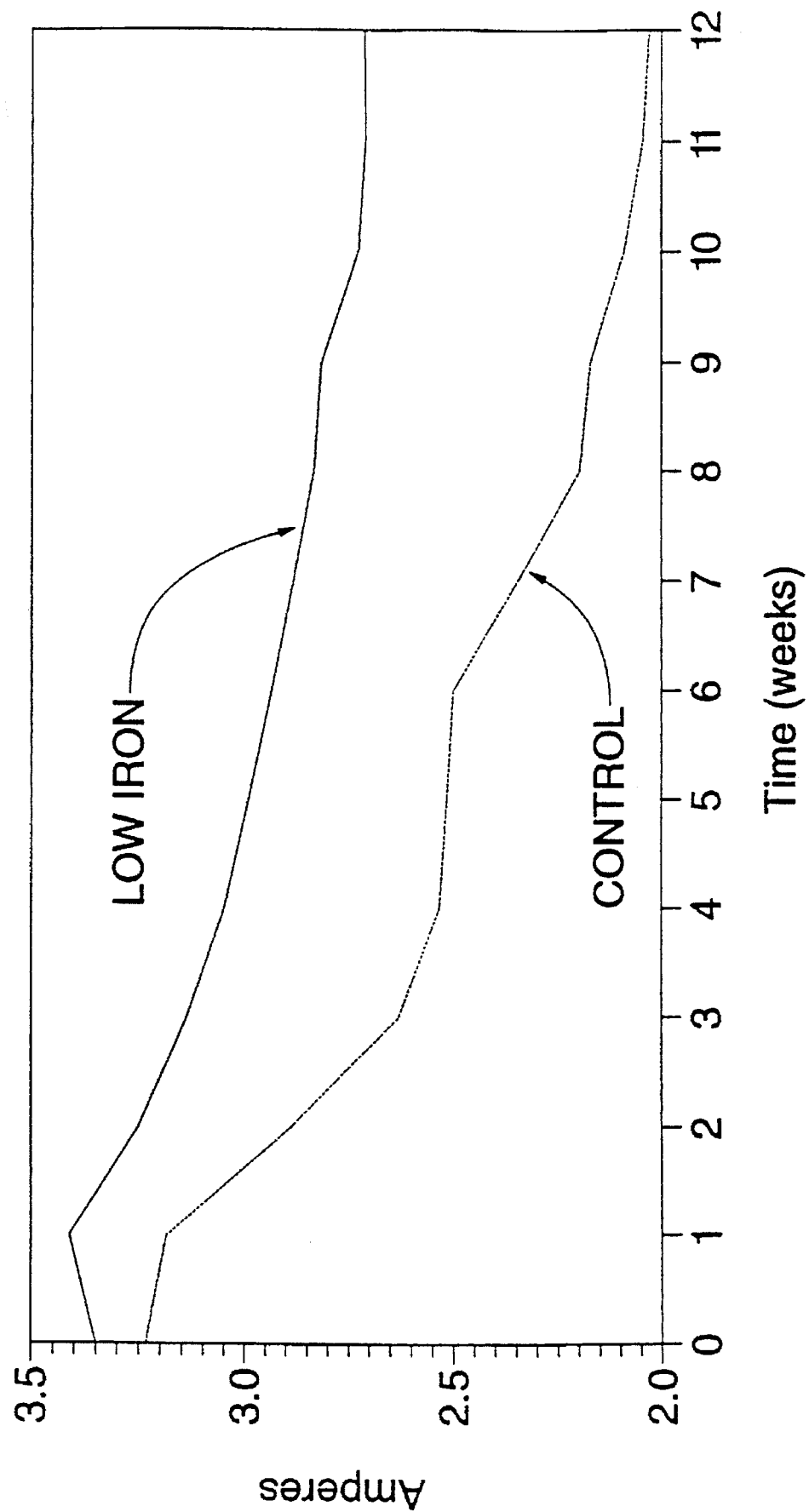
FIG. 14 is a graph of RT flash current test data obtained with conventional C-size heavy duty LeClanche cells and C-size heavy duty LeClanche cells of the present invention.
Figure 15:
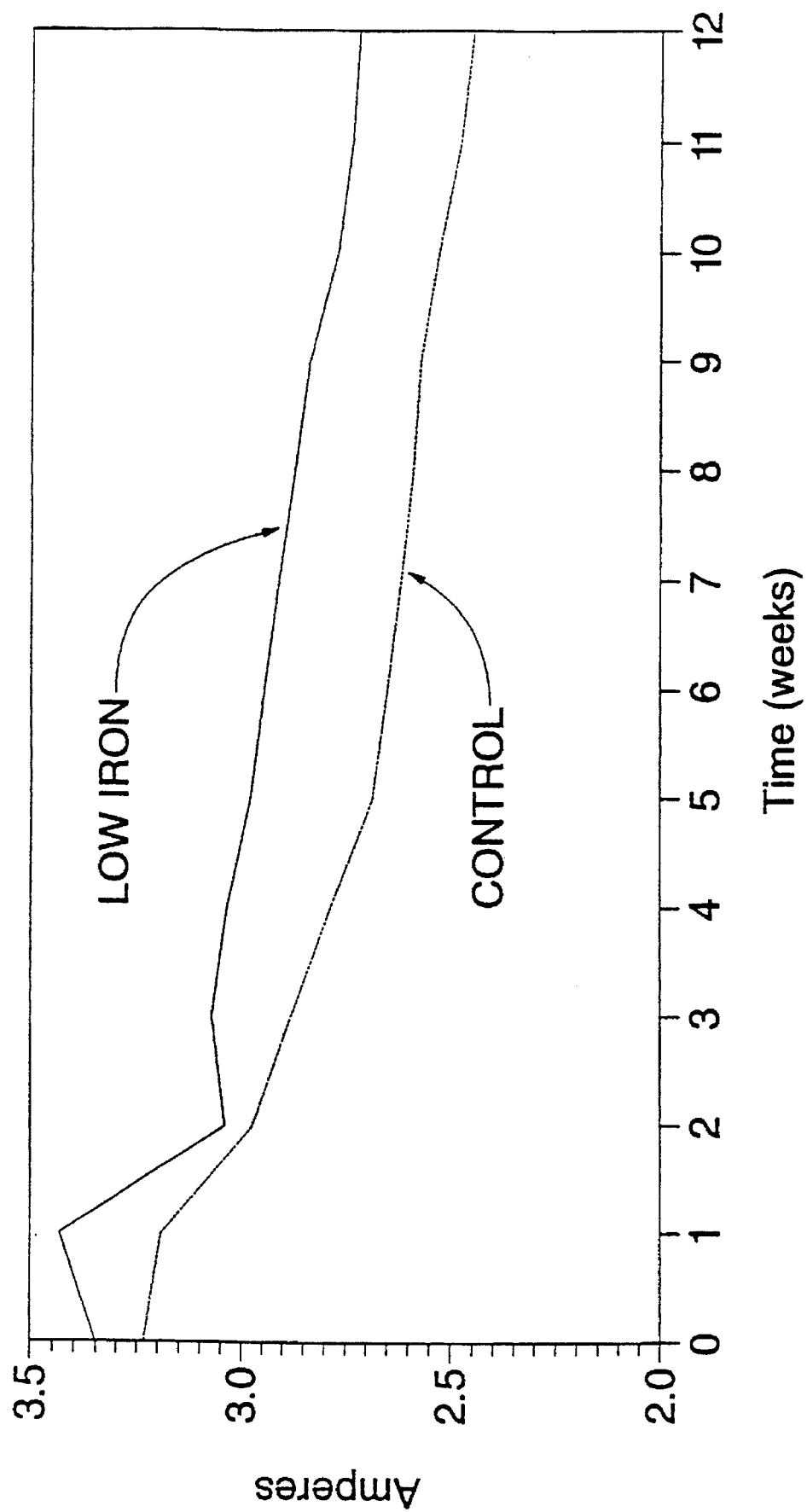
FIG. 15 is a graph of HT flash current test data obtained with C-size heavy duty LeClanche cells of the present invention.

FIGS. 14 and 15, respectively, show RT and HT flash current test results obtained with conventional Rayovac 4C heavy duty C-size LeClanche cells and Rayovac 4C heavy duty C-size LeClanche cells of the present invention. Example F tests used 10 conventional cells having zinc cans containing about 17 ppm iron, and 10 cells of the present invention having zinc cans containing about 6.1 ppm iron.

In Example F tests, all cells were tested in accordance with the RT and HT flash current procedures described above in Example C. Average values of the flash currents measured the Example F tests are shown in FIGS. 14 and 15 for RT and HT storage conditions, respectively.

FIG. 14 shows that after three months at room temperature cells of the present invention delivered an average of about 0.65 Amperes more than did conventional cells. FIG. 15 shows that after three months at high temperature cells of the present invention delivered an average of about 0.30 Amperes more than did the conventional cells. Thus, FIG. 14 shows the surprising and unexpected result that under room temperature storage conditions cells of the present invention provided, on average, over 10% more current than did conventional cells. Even more dramatically, FIG. 15 shows a surprising 30% increase in the current provided under high temperature conditions by cells of the present invention in respect of conventional cells.

EXAMPLE G

Figure 16:
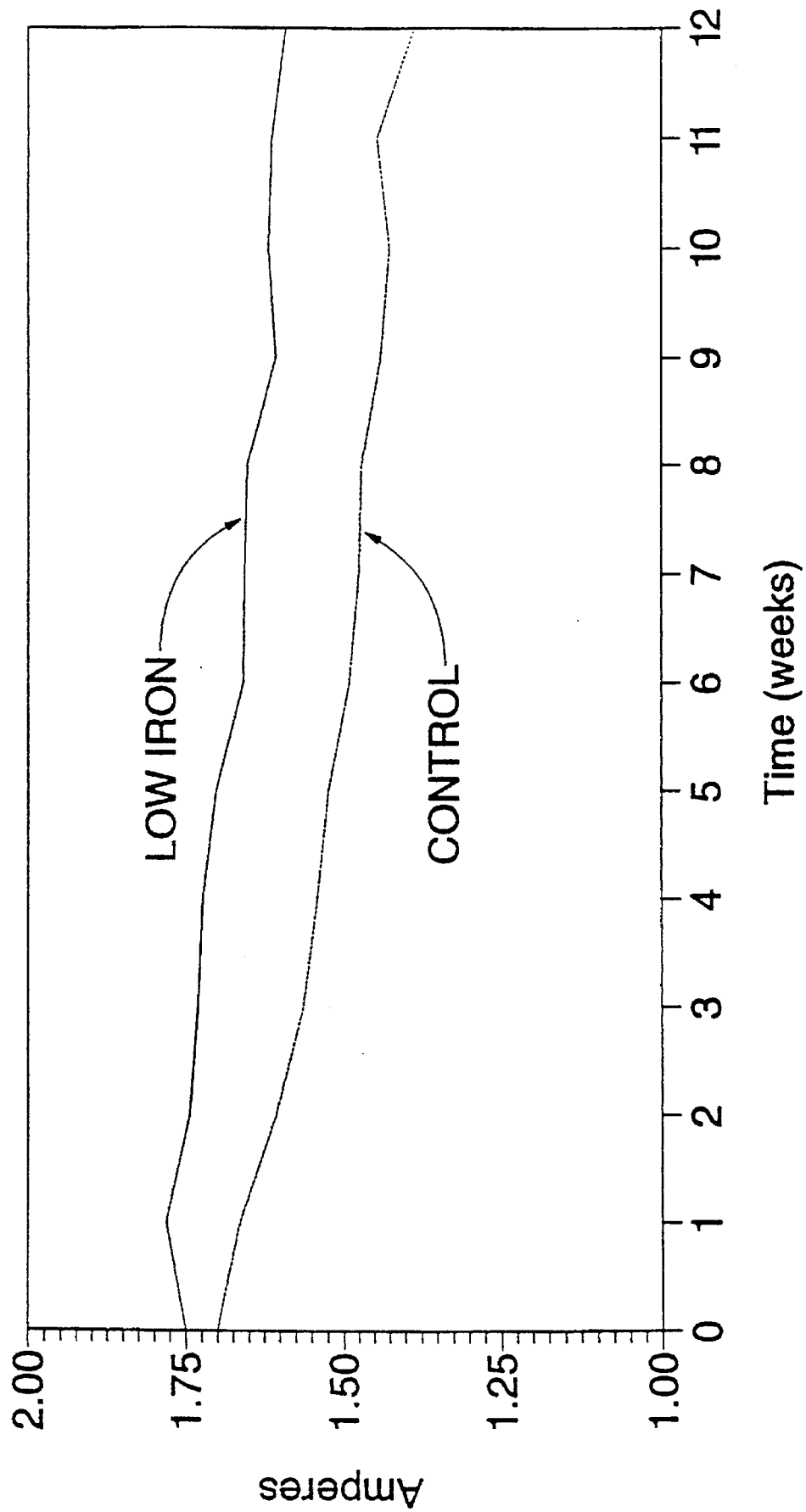
FIG. 16 is a graph of RT flash current test data obtained with AA-size heavy duty LeClanche cells of the present invention.
Figure 17:
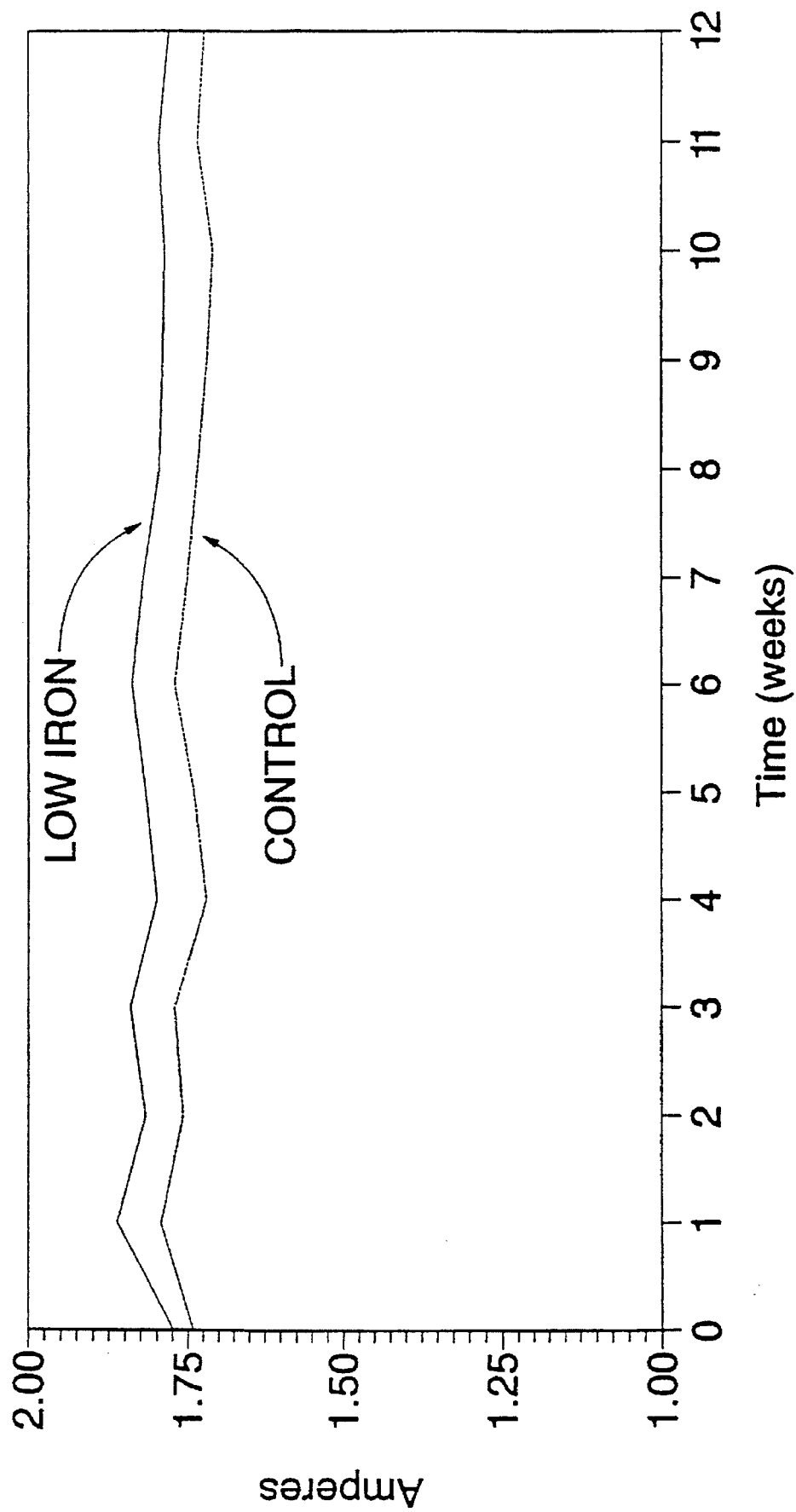
FIG. 17 is a graph of HI flash current test data obtained with AA-size heavy duty LeClanche cells of the present invention.

FIGS. 16 and 17, respectively, show RT and HT flash current test results obtained with Rayovac 5AA heavy duty AA-size LeClanche cells of the present invention. Example G tests used 10 cells having low iron zinc cans containing about 11.9 ppm iron, and 10 cells having very low iron zinc cans containing about 5.9 ppm iron.

In Example G tests, all cells were tested in accordance with the RT and HT flash current procedures described above in Example C. Average values of the flash currents recorded in Example G tests are shown in FIGS. 16 and 17 for RT and HT storage conditions, respectively.

FIG. 16 shows that after three months at room temperature very low iron zinc can cells delivered an average of about 0.25 Amperes more than did low iron zinc can cells. FIG. 17 shows that after three months at high temperature very low iron zinc can cells delivered an average of about 0.10 Amperes more than did low iron zinc can cells. Thus, FIG. 16 shows that under room temperature storage conditions very low iron zinc can cells provided, on average, about 22% more current than did low iron zinc can cells. FIG. 17 shows a 7% increase in the current provided under high temperature conditions by very low iron zinc can cells in respect of low iron zinc can cells.

EXAMPLE H

Figure 18:
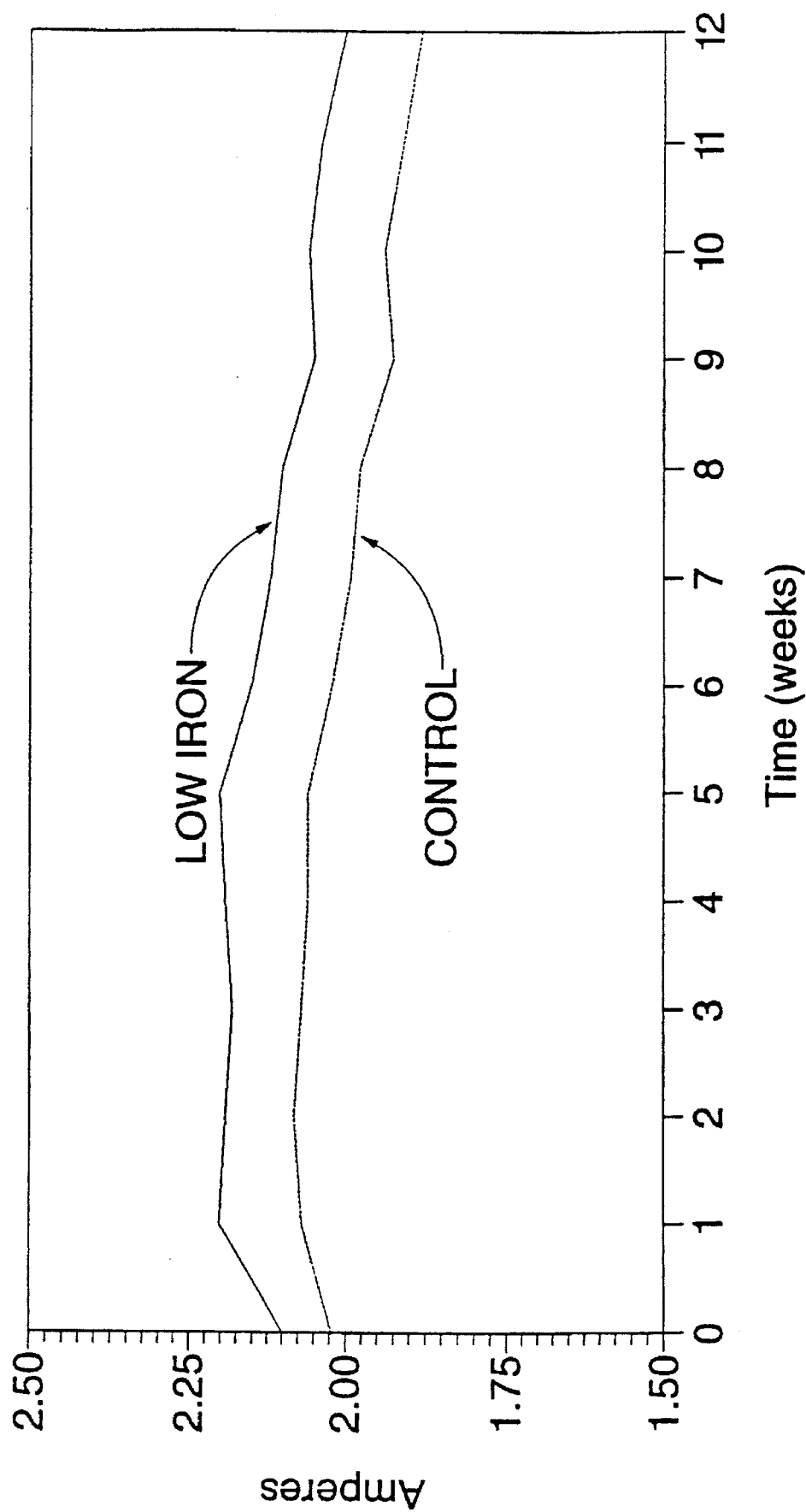
FIG. 18 is a graph of RT flash current test data obtained with AA-size general purpose LeClanche cells of the present invention.
Figure 19:
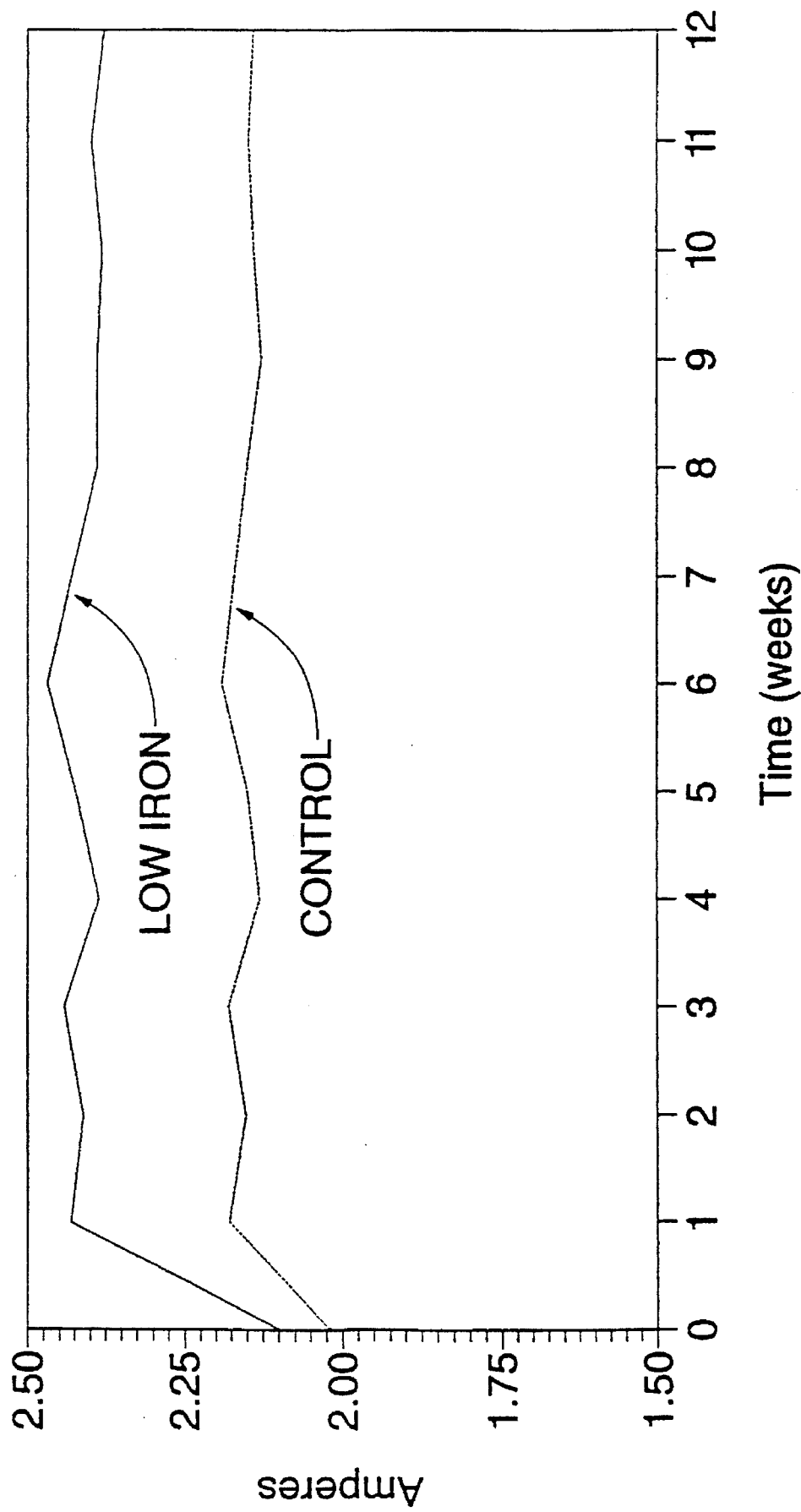
FIG. 19 is a graph of HT flash current test data obtained with AA-size general purpose LeClanche cells of the present invention.

FIGS. 18 and 19, respectively, show RT and HT flash current test results obtained with Rayovac 7AA general purpose AA-size LeClanche cells of the present invention. Example H tests used 10 cells having low iron zinc cans containing about 11.9 ppm iron, and 10 cells having very low iron zinc cans containing about 5.9 ppm iron.

In Example H tests, all cells were tested in accordance with the RT and HT flash current procedures described above in Example C. Average values of the flash currents recorded in Example H tests are shown in FIGS. 18 and 19 for room temperature and high temperature storage conditions, respectively.

FIG. 18 shows that after three months at room temperature very low iron zinc can cells delivered an average of about 0.13 Amperes more than did low iron zinc can cells. FIG. 19 shows that after three months at high temperature very low iron zinc can cells delivered an average of about 0.10 Amperes more than did low iron zinc can cells. Thus, FIG. 18 shows that under room temperature storage conditions very low iron zinc can cells provided, on average, about 7% more current than did low iron zinc can cells. FIG. 19 shows a 3% increase in the current provided under high temperature conditions by very low iron zinc can cells in respect of low iron zinc can cells.

EXAMPLE I

Figure 20:
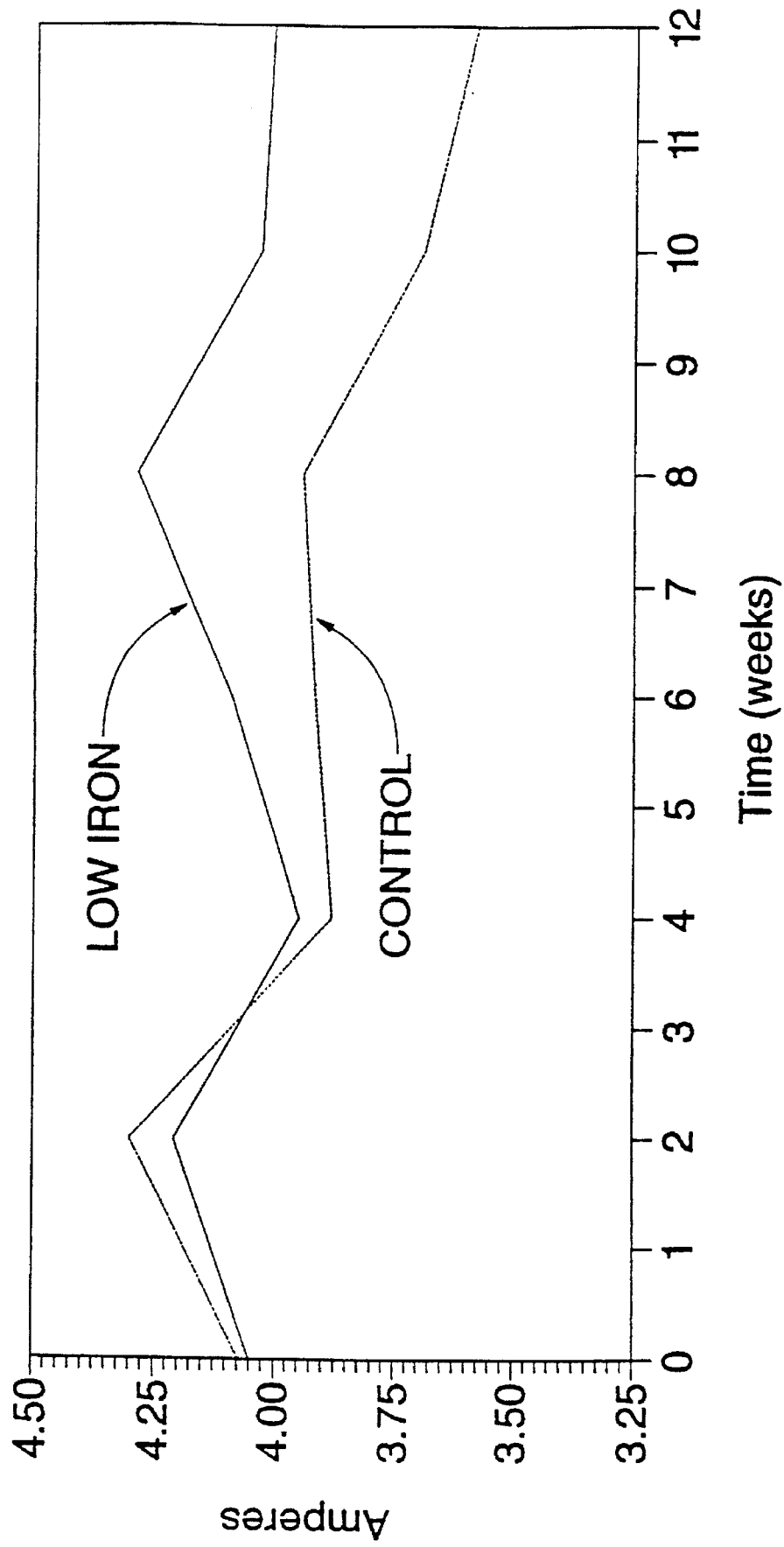
FIG. 20 is a graph of RT flash current test data obtained with conventional general purpose LeClanche 6-Volt lantern batteries and general purpose LeClanche 6-Volt lantern batteries of the present invention.
Figure 21:
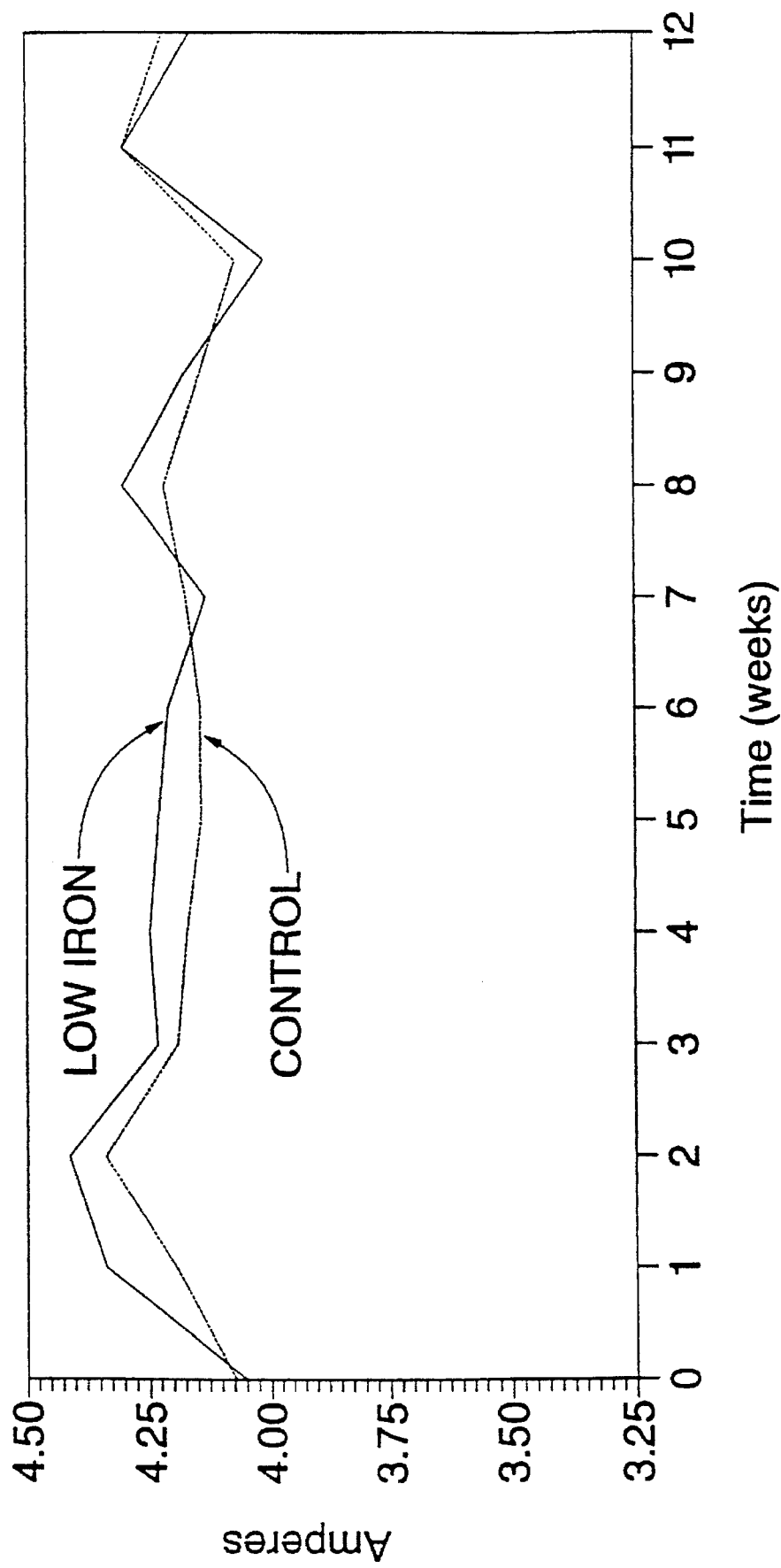
FIG. 21 is a graph of HT flash current test data obtained with conventional general purpose LeClanche 6-Volt lantern batteries and general purpose LeClanche 6-Volt lantern batteries of the present invention.

FIGS. 20 and 21, respectively, show RT and HT flash current test results obtained with Rayovac 941 lantern batteries containing either four conventional general purpose LeClanche cells wired in series, or containing four general purpose LeClanche cells of the present invention wired in series. Example I tests used 10 batteries containing 4 conventional LeClanche cells having zinc cans containing about 14.9 ppm iron, and 10 batteries containing 4 LeClanche cells of the present invention having zinc cans containing about 6.8 ppm iron.

In Example I tests, all batteries were tested in accordance with the RT and HT flash current procedures described above in Example C. Average values of the flash currents recorded in Example I tests are shown in FIGS. 20 and 21 for room temperature and high temperature storage conditions, respectively.

FIG. 20 shows that after three months at room temperature lantern batteries containing cells of the present invention delivered an average of about 0.40 Amperes more than did batteries containing conventional cells. FIG. 21 shows that after three months at high temperature lantern batteries of the containing cells of the present invention delivered an average of about 0.25 Amperes more than did lantern batteries containing conventional cells. Thus, FIG. 20 shows that after three months of storage under room temperature conditions lantern batteries of the present invention provided about 7% more current than did conventional lantern batteries. FIG. 21 shows that after three months under high temperature storage conditions lantern batteries of the present invention provided a 12% increase in current in respect of conventional lantern batteries.

EXAMPLE J

Figure 22:
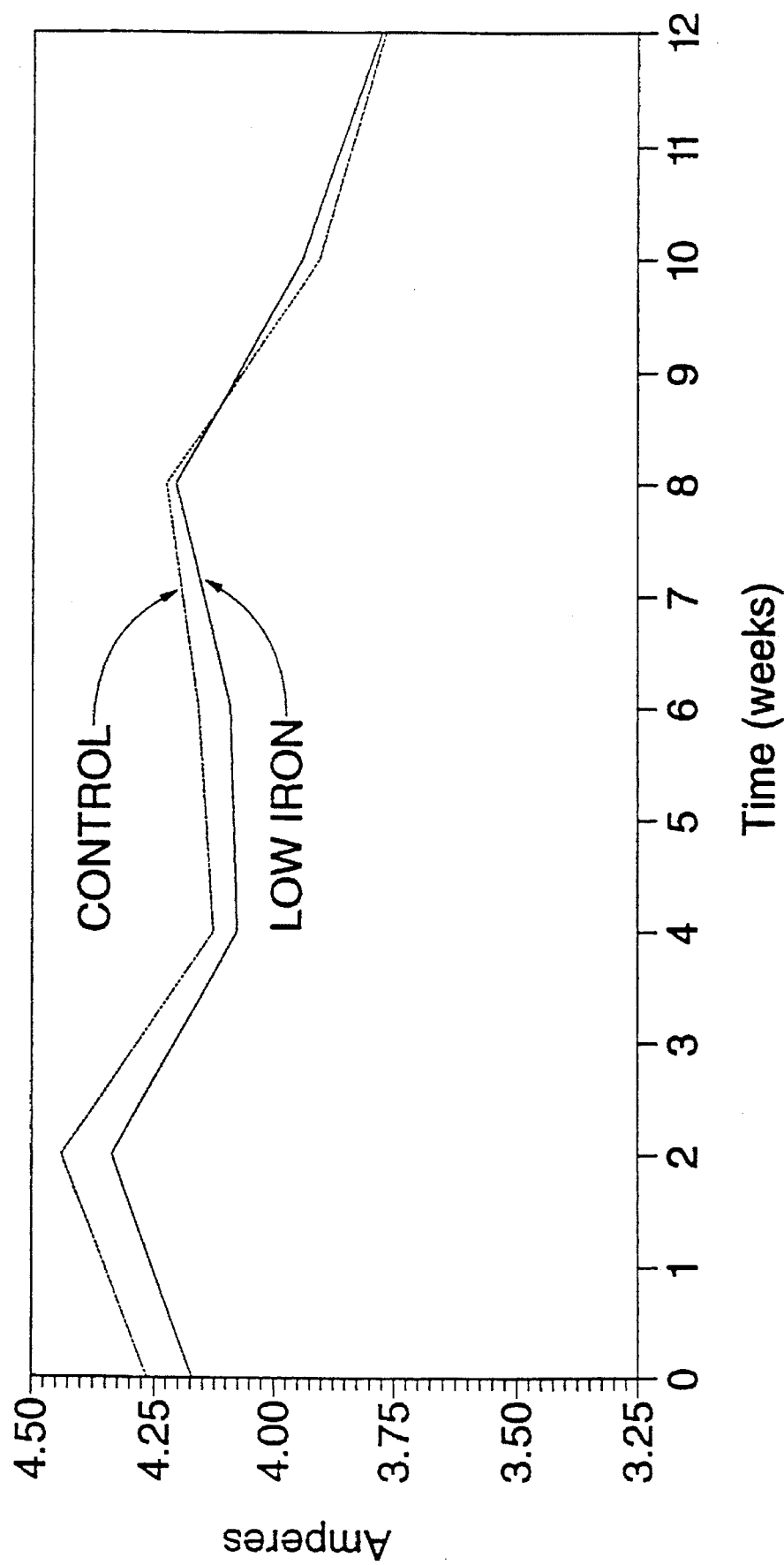
FIG. 22 is a graph of RT flash current test data obtained with conventional heavy duty LeClanche 6-Volt lantern batteries and heavy duty LeClanche 6-Volt lantern batteries of the present invention.
Figure 23:
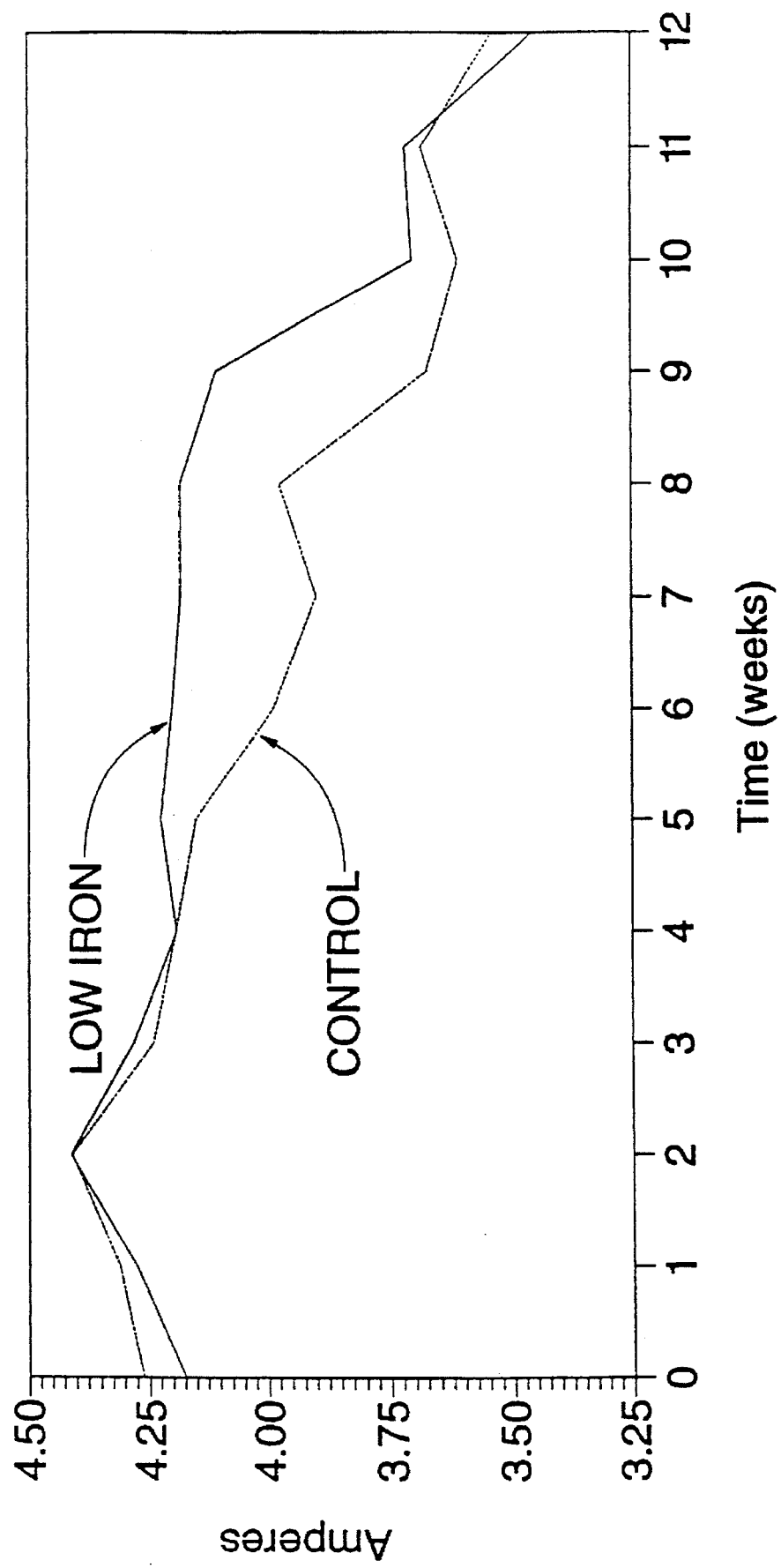
FIG. 23 is a graph of HT flash current test data obtained with conventional heavy duty LeClanche 6-Volt lantern batteries and heavy duty LeClanche 6-Volt lantern batteries of the present invention.

FIGS. 22 and 23, respectively, show RT and HT flash current test results obtained with Rayovac 944 lantern batteries containing either four conventional heavy duty LeClanche cells wired in series, or having four heavy duty LeClanche cells of the present invention wired in series. Example J tests used 10 batteries containing 4 conventional LeClanche cells having zinc cans containing about 14.9 ppm iron, and 10 batteries containing 4 LeClanche cells of the present invention having zinc cans containing about 6.8 ppm iron.

In Example J tests, all batteries were tested in accordance with the RT and HT flash current procedures described above in Example I. Average values of the flash currents recorded in Example J tests are shown in FIGS. 22 and 23 for room temperature and high temperature storage conditions, respectively.

FIG. 22 shows that after three months at room temperature lantern batteries containing cells of the present invention delivered about the same current as lantern batteries containing conventional cells. FIG. 23 shows that after three months at high temperature lantern batteries of the present invention delivered an average of about 0.10 Amperes more than did conventional lantern batteries. Thus, FIGS. 22 and 23 show that small increases in current are provided under room or high temperature conditions by lantern batteries of the present invention in respect of conventional lantern batteries.

EXAMPLE K

Table 10 presents 2.2 Ohm LIF test data obtained with Rayovac 6D heavy duty D-size LeClanche cells having zinc cans of varying iron concentrations, including those of the present invention. The first column of Table 10 shows the iron concentrations of the zinc cans of the various heavy duty cells tested. The second column of Table 10 shows the cell number of each cell tested. As a measure of cell capacity, the third column of Table 10 shows the total number of minutes required for each tested cell to discharge to 0.9 Volts.

TABLE 10

2.2 Ohm LIF Test Data for Heavy Duty D-Size Cells, Cell Capacity versus Zinc Can Iron Content

| Iron Content (ppm iron by weight) | Cell Number | Cell Capacity (cumulative minutes required to discharge to 0.9 V) |
|---|---|---|
| 50.0 | 1 | 355 |
|  | 2 | 356 |
|  | 3 | 355 |
|  | 4 | 356 |
|  | 5 | 356 |
|  | 6 | 357 |
| 34.2 | 7 | 388 |
|  | 8 | 386 |
|  | 9 | 387 |
|  | 10 | 387 |
|  | 11 | 387 |
|  | 12 | 387 |
|  | 13 | 356 |
|  | 14 | 356 |
|  | 15 | 356 |
|  | 16 | 359 |
|  | 17 | 356 |
|  | 18 | 356 |
| 12.5 | 19 | 420 |
|  | 20 | 419 |
|  | 21 | 419 |
|  | 22 | 419 |
|  | 23 | 419 |
|  | 24 | 419 |

TABLE 10-continued 2.2 Ohm LIF Test Data for Heavy Duty D-Size Cells,
Cell Capacity versus Zinc Can Iron Content

| Iron Content (ppm iron by weight) | Cell Number | Cell Capacity (cumulative minutes required to discharge to 0.9 V) |
|---|---|---|
| 8.4 | 25 | 449 |
|  | 26 | 450 |
|  | 27 | 449 |
|  | 28 | 449 |
|  | 29 | 449 |
|  | 30 | 450 |
|  | 31 | 482 |
|  | 32 | 454 |
|  | 33 | 455 |
|  | 34 | 456 |
|  | 35 | 452 |
|  | 36 | 482 |
|  | 37 | 424 |
|  | 38 | 452 |
|  | 39 | 424 |
|  | 40 | 451 |
|  | 41 | 451 |
|  | 42 | 453 |
|  | 43 | 488 |
|  | 44 | 513 |
|  | 45 | 486 |
|  | 46 | 487 |
|  | 47 | 513 |
|  | 48 | 485 |
|  | 49 | 483 |
|  | 50 | 481 |
|  | 51 | 482 |
|  | 52 | 456 |
|  | 53 | 483 |
|  | 54 | 482 |
| 2.6 | 55 | 581 |
|  | 56 | 547 |
|  | 57 | 581 |
|  | 58 | 581 |
|  | 59 | 579 |
|  | 60 | 519 |

Figure 24:
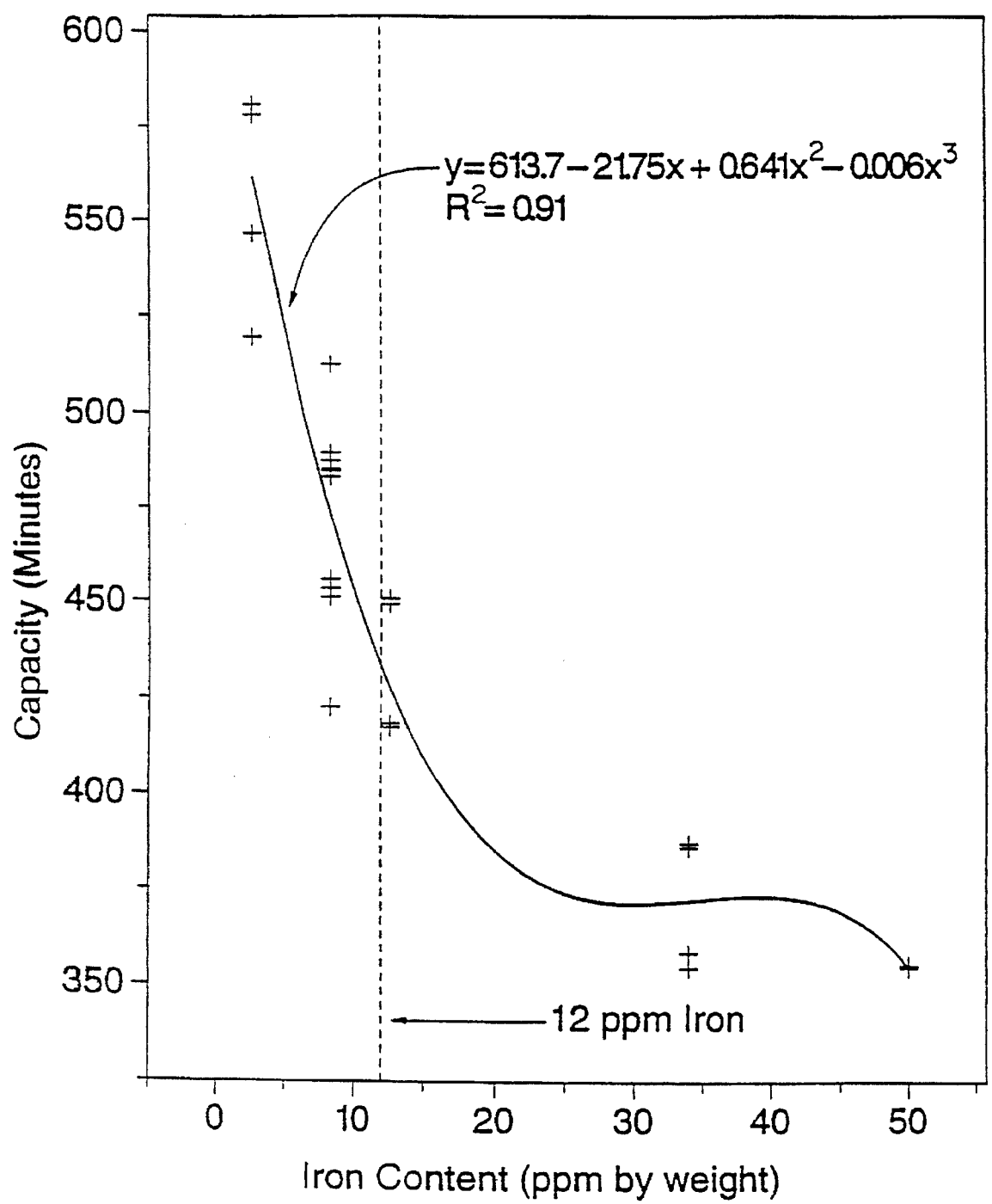
FIG. 24 is a graph of zinc can iron concentration versus cell capacity data for D-size heavy duty LeClanche cells discharged under 2.2 Ohm LIF conditions, including those of the present invention.

FIG. 24 is a graph of the average cell capacity versus iron concentration data presented in Table 10. In FIG. 24, an exponential curve of the following form appears:

$$y = A_0 + A_1 x + A_2 X^2 + A_3 x^3 \qquad (eq. 3)$$

The exponential curve of FIG. 24 was obtained by applying polynomial regression techniques to the data points of Table 10, wherein $A_0 = 613.7$, $A_1 = -21.75$, $A_2 = 0.641$, and $A_3 = -0.006$. The correlation coefficient, R, obtained for the fit between the curve of FIG. 24 and the data points of Table 10 was 0.952. The square of the correlation coefficient, $R^2$, was 0.91.

At pp. 100–103 in "Applied Statistics and the SAS® Programming Language," published in 1991 by Prentice Hall of Englewood Cliffs, N.J. in 1991, Cody and Smith teach that the R-squared value of 0.91 may be interpreted as the proportion of variance in the capacity of the tested cells that can be explained by the variation of iron content in the same cells. Thus, 91% of the variation in capacity of the cells tested in Example K can be explained by the variation in the iron content of the zinc cans of the tested cells.

Because a high R-squared value of 0.91 corresponds to the fit between Table 10 data and the curve shown in FIG. 24, a strong, non-linear correlation must exist between iron content and capacity in LeClanche cells of the present invention. The nonlinear, steeply curving character of the left-hand portion of the curve shown in FIG. 24 exhibits clearly the unexpected and unpredictable discovery made by the inventors of the present invention: A dramatic increase in cell capacity is achieved in LeClanche cells having zinc cans containing less than about 12 ppm iron by weight. FIG. 24 shows that the unexpected increase in capacity becomes especially pronounced when the iron content of the zinc can drops below about 12 ppm by weight. The inventors, therefore, have discovered that a heretofore unknown criticality exists in respect of the iron content of zinc cans for LeClanche cells and the capacity of same.

EXAMPLE L

Table 11 presents 3.9 Ohm LIF test data obtained with Rayovac 6D heavy duty D-size LeClanche cells having zinc cans of varying iron concentrations, including those of the present invention. The first column of Table 11 shows the iron concentrations of the zinc cans of the various heavy duty cells tested. The second column of Table 11 shows the cell number of each cell tested. As a measure of cell capacity, the third column of Table 11 shows the total number of minutes required for each tested cell to discharge to 0.9 Volts.

TABLE 11

3.9 Ohm LIF Test Data for Heavy Duty D-Size Cells,
Cell Capacity versus Zinc Can Iron Content

| Iron Content (ppm iron by weight) | Cell Number | Cell Capacity (cumulative minutes required to discharge to 0.9 V) |
|---|---|---|
| 50.0 | 61 | 624 |
|  | 62 | 558 |
|  | 63 | 630 |
|  | 64 | 618 |
|  | 65 | 570 |
|  | 66 | 624 |
| 34.2 | 67 | 738 |
|  | 68 | 684 |
|  | 69 | 684 |
|  | 70 | 684 |
|  | 71 | 738 |
|  | 72 | 744 |
|  | 73 | 780 |
|  | 74 | 738 |
|  | 75 | 792 |
|  | 76 | 756 |
|  | 77 | 768 |
|  | 78 | 768 |
| 12.5 | 79 | 864 |
|  | 80 | 858 |
|  | 81 | 864 |
|  | 82 | 918 |
|  | 83 | 864 |
|  | 84 | 1044 |
|  | 85 | 852 |
|  | 86 | 876 |
|  | 87 | 846 |
|  | 88 | 858 |
|  | 89 | 858 |
|  | 90 | 858 |
| 8.4 | 91 | 1026 |
|  | 92 | 972 |
|  | 93 | 984 |
|  | 94 | 990 |
|  | 95 | 972 |
|  | 96 | 1032 |
|  | 97 | 912 |
|  | 98 | 924 |
|  | 99 | 966 |
|  | 100 | 918 |
|  | 101 | 918 |
|  | 102 | 912 |
|  | 103 | 828 |
|  | 104 | 888 |
|  | 105 | 828 |

TABLE 11-continued 3.9 Ohm LIF Test Data for Heavy Duty D-Size Cells,
Cell Capacity versus Zinc Can Iron Content

| Iron Content (ppm iron by weight) | Cell Number | Cell Capacity (cumulative minutes required to discharge to 0.9 V) |
|---|---|---|
| 2.6 | 106 | 882 |
| | 107 | 834 |
| | 108 | 828 |
| | 109 | 822 |
| | 110 | 882 |
| | 111 | 870 |
| | 112 | 834 |
| | 113 | 882 |
| | 114 | 882 |
| | 115 | 1002 |
| | 116 | 1008 |
| | 117 | 1062 |
| | 118 | 954 |
| | 119 | 1008 |
| | 120 | 1020 |

Figure 25:
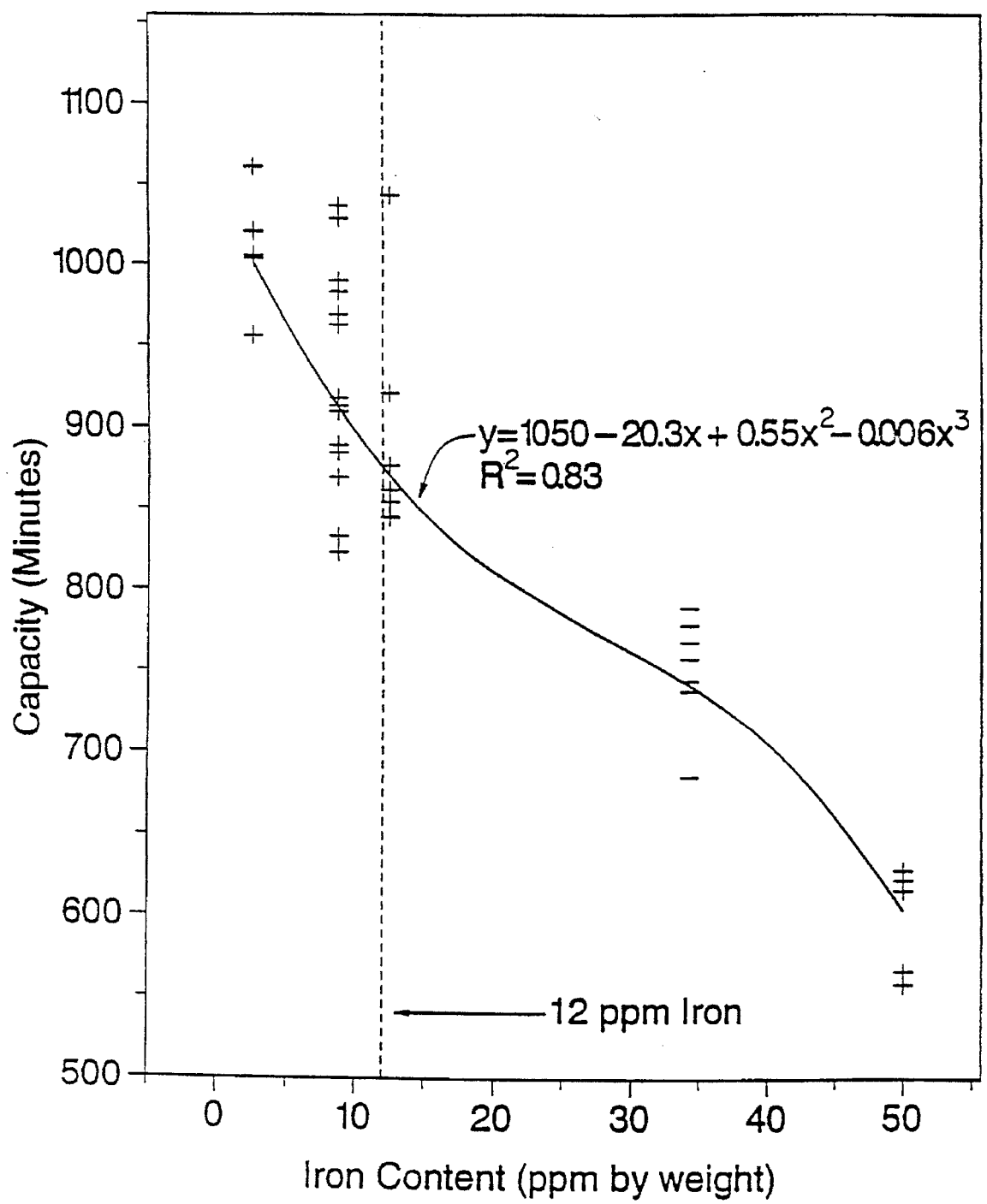
FIG. 25 is a graph of zinc can iron concentration versus cell capacity data for D-size heavy duty LeClanche cells discharged under 3.9 Ohm LIF conditions, including those of the present invention.

FIG. 25 is a graph of the average cell capacity versus iron concentration data listed in Table 11. In FIG. 25 an exponential curve of the form of equation 3 appears. The exponential curve of FIG. 25 was obtained by applying polynomial regression techniques to the data points of Table 11, wherein $A_0=17.50$, $A_1=-0.339$, $A_2=0.009$, and $A_3=-1.075$. The correlation coefficient obtained for the fit between the curve of FIG. 25 and the data points of Table 11 was $R=0.909$ (or, $R^2=0.83$).

In accordance with the teachings of Cody and Smith, supra, the R-squared value of 0.83 may be interpreted as the proportion of variance in the capacity of the tested cells that can be explained by the variation of iron content in the same cells. Thus, 83% of the variation in capacity of the cells tested in Example L can be explained by the variation in the iron content of the zinc cans of the tested cells.

As in Example K, a high R-squared value of 0.83 corresponds to Table 11 data and the curve shown in FIG. 25, thus strengthening substantially the conclusion that a strong, non-linear correlation exists between iron content and capacity in LeClanche cells. And as in Example K, the nonlinear character of the curve shown in FIG. 25 exhibits the unexpected and unpredictable discovery made by the inventors of the present invention, wherein a significant increase in cell capacity is achieved in LeClanche cells having zinc cans containing less than about 12 ppm by weight iron. Like FIG. 24, FIG. 25 demonstrates that the unexpected increase in capacity becomes especially pronounced when the iron content of zinc cans drops below about 12 ppm by weight. Table 11 data, FIG. 25, and an R-Squared correlation coefficient of 0.83, confirm the discovery of the heretofore unknown and important criticality existing in respect of the iron content of zinc cans for LeClanche cells and the capacity of same.

Those skilled in the art will now see that certain modifications can be made to the compositions, apparatus, and methods disclosed herein as preferred embodiments, without departing from the spirit of the present invention. Thus, the spirit and scope of the present invention is not restricted to what is described above. Within the general framework of LeClanche cells or batteries of the present invention, and methods of making or using same, a very large number of permutations and combinations will now be seen to be possible, all of which are within the scope of the present invention. For example, the present invention encompasses within its scope low iron zinc alloys having inert or low chemical activity constituents incorporated therein that are not recited herein. Such constituents could include, for example, small ceramic beads or particles. Likewise, although the specification hereof does not disclose any details concerning a method of making the alloy or anode of the present invention that includes the step of continuous casting, the present invention encompasses within its scope such a step.

We claim:

1. A method of making a zinc anode configured for use in a LeClanche cell, comprising the steps of:
   (a) melting a zinc starting material containing no more than about 12 ppm by weight iron; and
   (b) fabricating the molten zinc alloy into an anode configured for use in a LeClanche cell,
   wherein steps (a) and (b) are conducted under conditions effective to minimize contact between molten zinc and iron susceptible to contaminating the molten zinc, whereby the anode so produced contains at least 95 wt. % zinc and no more than about 12 ppm by weight of iron.

2. The method of claim 1, wherein step (a) further comprises adding to the molten zinc at least one alloying element selected from the group consisting of up to 2000 ppm by weight cadmium, up to 6000 ppm by weight lead, up to 100 ppm by weight magnesium, up to 600 ppm by weight manganese, up to 200 ppm by weight copper, up to 10 ppm by weight nickel, up to 1000 ppm by weight thallium, up to 8000 ppm by weight of aluminum, up to 8000 ppm by weight of indium, up to 8000 ppm by weight of bismuth, and up to 8000 ppm by weight of calcium.

3. The method of claim 1, further comprising controlling the amount of iron in steps (a) and (b) so that the zinc anode contains no more than 11 ppm iron by weight.

4. The method of claim 1, further comprising controlling the amount of iron in steps (a) and (b) so that the zinc anode contains no more than 6 ppm iron by weight.

5. The method of claim 1, further comprising controlling the amount of iron in steps (a) and (b) so that the zinc anode contains no more than 4 ppm iron by weight.

6. The method of claim 1, further comprising controlling the amount of iron in steps (a) and (b) so that the zinc anode contains no more than 2 ppm iron by weight.

7. The method of claim 1, further comprising controlling the amount of iron in steps (a) and (b) so that the zinc anode contains no more than 1 ppm iron by weight.

8. The method of claim 1, further comprising controlling the amount of iron in steps (a) and (b) so that the zinc anode contains iron in the range of from 2 to 10 ppm iron by weight.

9. The method of claim 1, wherein step (b) further comprises drawing and impact extruding the zinc alloy under conditions effective to minimize contact between the zinc alloy and iron susceptible to contaminating the zinc alloy.

10. The method of claim 9, wherein step (b) further comprises configuring the anode for use in a round LeClanche cell such that the anode forms a cylindrical can having a bottom and a sidewall extending upwardly therefrom, the can having an initially open top end.

11. The method of claim 1, wherein step (b) further comprises configuring the anode for use in a round LeClanche cell selected from the group consisting of AAA, AA, C and D sizes.

12. The method of claim 1, wherein step (b) further comprises configuring the anode for use in a flat LeClanche cell such that the anode forms a rectangular member having substantially flat opposing major top and bottom surfaces.

13. The method of claim 1, wherein step (b) further comprises:

casting the zinc alloy and forming the cast zinc alloy into a calot or sheet under conditions effective to minimize contact between the molten zinc and iron susceptible to contaminating the zinc alloy; and configuring the anode for use in a round LeClanche cell such that the anode forms a cylindrical can having a bottom and a sidewall extending upwardly therefrom, the can having an initially open top end.

14. The method of claim 13, wherein the forming step further comprises casting and then rolling the zinc alloy.

15. The method of claim 1, wherein step (a) is carried out using an iron-containing container lined with a material that substantially prevents migration of iron from the container into the molten alloy.

16. The method of claim 1, wherein step (a) is carried out using a container made of a material that substantially prevents migration of iron in the molten alloy.

17. The method of claim 15, wherein the iron-containing container is lined with a material selected from stainless steel, graphite and a refractory material.

18. The method of claim 16, wherein the container consists essentially of a material selected from stainless steel, graphite and a refractory material.

19. A method of making a zinc anode configured for use in a LeClanche cell, comprising the steps of:

(a) melting a zinc starting material containing no more than about 8 ppm by weight iron in a zinc under conditions effective to minimize contact between the molten zinc and iron susceptible to contaminating the molten zinc; and (b) casting the zinc alloy;

(c) forming the cast zinc alloy into a calot or sheet; and (d) configuring the cast zinc alloy as an anode for use in a LeClanche cell, wherein the anode so produced contains at least 95 wt. % more than about 12 ppm by weight of iron.

20. The method of claim 19, wherein steps (b) and (c) are conducted under conditions effective to minimize contact between the molten zinc and iron susceptible to contaminating the zinc alloy.

* * * * *